US012296903B2

(12) United States Patent
Zhu et al.

(10) Patent No.: US 12,296,903 B2
(45) Date of Patent: May 13, 2025

(54) WIND AND TRANSMISSION DELAY MANAGEMENT FOR CONNECTED VEHICLES

(71) Applicant: Hitachi Astemo, Ltd., Ibaraki (JP)

(72) Inventors: Xiaoliang Zhu, Northville, MI (US); Subrata Kumar Kundu, Canton, MI (US); Paul Liu, Irvine, CA (US)

(73) Assignee: HITACHI ASTEMO, LTD., Ibaraki (JP)

( * ) Notice: Subject to any disclaimer, the term of this patent is extended or adjusted under 35 U.S.C. 154(b) by 77 days.

(21) Appl. No.: 18/368,193

(22) Filed: Sep. 14, 2023

(65) Prior Publication Data

US 2025/0091643 A1  Mar. 20, 2025

(51) Int. Cl.
| | |
|---|---|
| *B62D 6/00* | (2006.01) |
| *B60W 10/18* | (2012.01) |
| *B60W 10/20* | (2006.01) |
| *B62D 6/04* | (2006.01) |
| *G07C 5/00* | (2006.01) |

(52) U.S. Cl.
CPC .............. *B62D 6/04* (2013.01); *B60W 10/18* (2013.01); *B60W 10/20* (2013.01); *G07C 5/008* (2013.01)

(58) Field of Classification Search
CPC ... G01P 5/245; B60W 2555/20; B60W 10/18; B60W 10/20; B62D 6/04; G07C 5/008
See application file for complete search history.

(56) References Cited

U.S. PATENT DOCUMENTS

| | | | | |
|---|---|---|---|---|
| 10,228,696 | B2 * | 3/2019 | Myers | B60W 50/14 |
| 11,046,430 | B1 * | 6/2021 | Melton | G08G 5/0013 |
| 11,493,938 | B1 * | 11/2022 | Harris | G05D 1/654 |
| 11,804,138 | B2 * | 10/2023 | Foland | G08G 5/0039 |
| 2017/0197656 | A1 | 7/2017 | Oh | |
| 2019/0069257 | A1 * | 2/2019 | Iwakiri | G07C 5/008 |

(Continued)

FOREIGN PATENT DOCUMENTS

| | | |
|---|---|---|
| CN | 104608817 B | 1/2017 |
| JP | 08043421 A * | 2/1996 |

(Continued)

*Primary Examiner* — Logan M Kraft
*Assistant Examiner* — Joshua Campbell
(74) *Attorney, Agent, or Firm* — MATTINGLY & MALUR, PC

(57) ABSTRACT

In some examples, a service computing device receives, from a vehicle computing device onboard a vehicle, a communication including sensor data obtained from at least one sensor onboard the vehicle. Based on the communication, the service computing device determines a transmission delay corresponding to a difference between a time when the vehicle sent the communication and a time when the communication was received. Based on the communication, the service computing device determines a trajectory of the vehicle on a travel route. Based on the sensor data, transmission delay, wind direction and magnitude, surrounding objects, and trajectory, the service computing device determines vehicle control information for the vehicle. The service computing device sends, to the vehicle, based at least on the vehicle control information, at least one instruction causing the vehicle to perform at least one control operation for traversing one or more locations associated with the trajectory of the vehicle.

19 Claims, 11 Drawing Sheets

(56) References Cited

U.S. PATENT DOCUMENTS

2020/0124765 A1* 4/2020 Nishimura .............. H04W 4/44
2021/0291851 A1* 9/2021 Melen .................... G07C 5/008

FOREIGN PATENT DOCUMENTS

| JP | 2019026100 A | 2/2019 |
| JP | 2019064572 A | 4/2019 |
| JP | 7001009 B2 | 1/2022 |

* cited by examiner

| LATITUDE ⸺402 | LONGITUDE ⸺404 | PROTOCOL ⸺406 | DATA SIZE (KB) ⸺408 | VEHICLE ID ⸺410 | CELLULAR TYPE ⸺412 | VEHICLE SPEED (MPH) ⸺414 | TIMESTAMP ⸺416 | AVERAGE DELAY (ms) ⸺418 |
|---|---|---|---|---|---|---|---|---|
| 42.3715533455 | -83.4802323603 | MQTT | 150 | JUKI908JU783 | 4G-LTE | 45 | 1663611677 | 340 |
| 42.3662801091 | -83.4626764655 | KAFKA | 509 | XJKL8923JY78 | 5G | 57 | 1663611861 | 35 |

| 502 | 504 | 506 | 508 | 510 | 512 | 514 | 516 | 518 | 520 |
|---|---|---|---|---|---|---|---|---|---|
| LATITUDE | LONGITUDE | WIND SPEED (MPH) | WIND DIRECTION | VEHICLE ID | VEHICLE HEADING | VEHICLE SPEED (MPH) | LANE NUMBER | TIMESTAMP | ERROR WITH SIMULATION |
| 42.3715533455 | -83.4802323603 | 20 | N | JUKI908JU783 | S | 45 | 2 | 1663611677 | 1.9 |
| 42.3662801091 | -83.4626764655 | 15 | SE | XJKL8923JY78 | N | 57 | NA | 1663611861 | 5.8 |

| Vehicle ID | Lane | Latitude | Longitude | Wind Speed (MPH) and Direction | Vehicle Heading | Vehicle Speed (MPH) |
|---|---|---|---|---|---|---|
| JUKI908JU785 | Left side | 42.3715533455 | -83.4802323603 | 20 N | S | 45 |
| JUKI908JU783 | Ego lane | 42.3660801091 | -83.4626764655 | | N | 48 |
| JUKI908JU784 | Right side | 42.3650783403 | -83.4267632954 | | N | 45 |
| JUKI908JU789 | Right side | 42.3650639653 | -83.4628349763 | | N | 42 |

FIG. 10

WIND AND TRANSMISSION DELAY MANAGEMENT FOR CONNECTED VEHICLES

BACKGROUND

Wind can affect vehicle operation. For example, a crosswind may include any wind that has a component that is perpendicular to a direction of travel of a vehicle. Crosswinds can be problematic for vehicles traveling on wet or slippery roads and, in the case of strong crosswinds, even on dry roads. Furthermore, crosswinds may disproportionately affect vehicles that have large side areas such as vans, box trucks, and tractor-trailers. Crosswinds can affect the aerodynamics of a vehicle and may move the path of the vehicle sideways. This can be dangerous for the vehicle and nearby vehicles because of the possibility of lift forces that may cause the vehicle to lose traction, change direction of travel, or otherwise create a hazard to the vehicle and nearby vehicles. Conventional techniques for vehicles to detect crosswinds and respond appropriately for improving vehicle safety are fairly limited, and are typically only configured to take an action when a predefined wind event is detected by the vehicle sensors. In addition, the occurrence of crosswinds that may have an effect on vehicle safety can be highly dynamic events, which may be substantially affected by the presence or absence of other nearby vehicles, the size of the other vehicles, the presence of buildings and other fixed structures, and so forth.

SUMMARY

In some implementations, a service computing device receives, from a vehicle computing device onboard a vehicle, a communication including sensor data obtained from at least one sensor onboard the vehicle. Based on the communication, the service computing device determines a transmission delay corresponding to a difference between a time when the vehicle sent the communication and a time when the communication was received. Based on the communication, the service computing device determines a trajectory of the vehicle on a travel route. Based on the sensor data, the transmission delay, and the trajectory, the service computing device determines vehicle control information for the vehicle. The service computing device sends, to the vehicle, based at least on the vehicle control information, at least one instruction causing the vehicle to perform at least one control operation for traversing one or more locations associated with the trajectory of the vehicle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example data structure of information included in the transmission delay database according to some implementations.

FIG. 5 illustrates an example data structure of information included in the wind map database according to some implementations.

FIG. 10 illustrates an example data structure for maintaining vehicle trajectory information for waypoints according to some implementations.

DESCRIPTION

Figure 1:
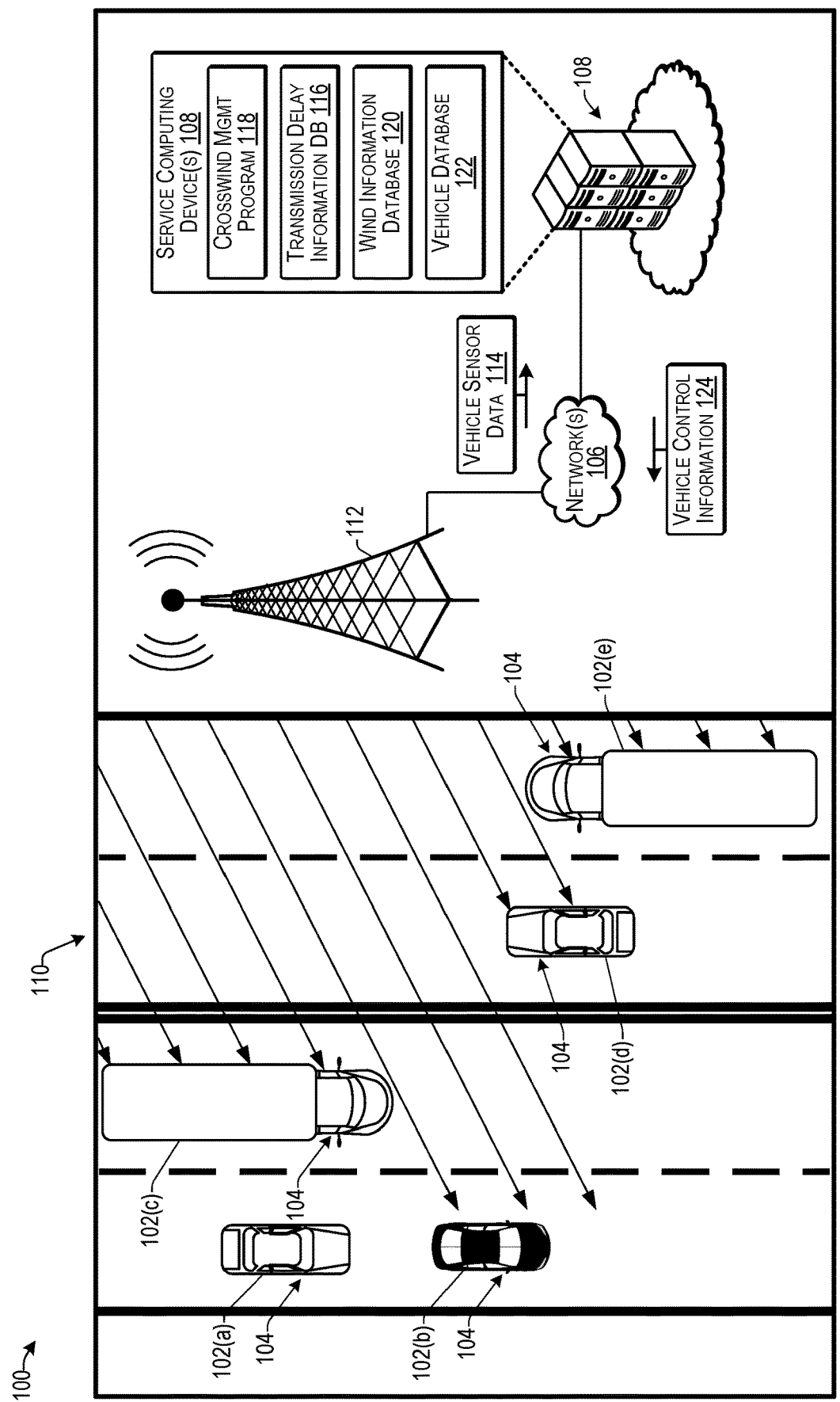
FIG. 1 illustrates an example system for wind and transmission delay management according to some implementations.

Some implementations herein are directed to techniques and arrangements for crosswind management for vehicles based in part on utilizing connected vehicle technology for determining crosswind information and for providing crosswind management information to respective vehicles. For example, the crosswind information determined by the system herein may be used for precise vehicle control to improve driving safety and comfort in the event that crosswinds are encountered by the vehicle. Some examples utilize data from connected vehicles and other sources for detecting crosswinds, and may implement techniques that improve the accuracy of determining the times and locations of crosswinds. Additionally, some examples herein may take into account delays in data transmission, such as by referring to a satellite positioning system clock (e.g., such as may be accessed through the Global Positioning System (GPS) or any of various other satellite positioning systems) to enable more accurate generation of vehicle control information. Further, some examples herein may generate and maintain a crosswind database, a data transmission delay database, and information related to estimated surrounding environments of vehicles to enable accurate vehicle control information to be generated and provided directly to vehicles to assist the vehicles in safely passing through areas with crosswinds.

Implementations herein may employ a large amount of data collecting units by which the collected data is aggregated or filtered to form one or more databases that can then be used to generate control information. Examples of data collection and sharing according to some examples herein may include: (i) connected vehicles for crosswind detection and sharing, weather detection and sharing, road hazard detection and sharing, and the like; (ii) autonomous driving (AD) or delivery applications where AD vehicles are also used for capturing the surrounding environment, such as for map updating and real-time conditions information; and (iii) smart city applications where vehicles, smart phones, or other edge devices may be used for obtaining city information for the service computing devices, such information including but not limited to traffic conditions, public transportation status, road conditions, wind and other weather conditions, and the like.

Conventional methods for vehicle control during crosswind events typically use various types of sensors installed on the particular vehicle to detect a crosswind event as it is occurring, and then compensate for the effect under certain conditions (e.g., if vehicle speed is greater than 40 mph). However, conventional methods are typically stand-alone techniques and are only able to take action when a predefined wind event is detected. In addition, crosswinds can be not only highly dynamic events associated with highly changing wind speeds (i.e., direction and magnitude) and frequencies, but are also affected by the immediate environment of each vehicle, e.g., whether there are any surrounding vehicles that may be blocking some or a portion of the crosswinds, whether there are any buildings, other structures, geographical features, or the like, that may be blocking crosswinds, etc. Because of these considerations, the conventional standalone systems often do not accurately detect crosswind events, which can result in unsafe situations.

Furthermore, some conventional online databases exist that simulate wind conditions around the world, such as based on wind measurement data from government or other sources. However, the actual wind measurement data in these databases is typically updated relatively very slowly (e.g., once per hour) and often the measurement locations are sparse. Accordingly, information contained in these databases is generally not useful for precise vehicle control to improve driving safety and comfort when crosswinds are encountered by a particular vehicle. Additionally, because the transmission delays between connected vehicles and remote databases maintained by remote servers may vary significantly, it can be challenging to generate control information at a timing that is sufficient for instructing vehicles to take specific actions at specific locations and at specific times.

To solve these and other problems with conventional systems, implementations herein employ connected data to determine when a particular vehicle is likely to encounter crosswinds and to provide control information to the vehicle in anticipation of the vehicle encountering crosswinds. According to the examples herein, a crosswind event can be detected and managed accurately both in time and location for specific vehicles. In addition, precise vehicle control information can also be generated to increase driving safety and comfort when passing through an area subject to crosswinds. In particular, by employing connected vehicle technology, real-time wind information can be used for precise vehicle control to improve driving safety and comfort.

In some examples, the vehicle may access a connected data analytics platform provided by the service computing devices and may provide information to the data analytics platform obtained by the onboard sensors available on the vehicle, as well as providing a current location of the vehicle. Further, the vehicle may receive, from the data analytics platform, information about crosswinds that may be encountered by the vehicle immediately or in the near future during travel along an expected route.

The connected vehicle technology according to the implementations herein may be employed to mitigate the effects of crosswinds, and increase vehicle safety and comfort under crosswind events, by sending vehicle control messages to specific vehicles. However, because there may be a transmission delay between vehicles and remote databases located on cloud platforms or remote servers, and which may vary from time to time, implementations herein are able to take the transmission delays into account when generating the control information for the vehicles to enable the vehicles to take actions at specific locations and specific times. Further, examples herein may generate and maintain a transmission delay database or other data structure that can be used for vehicle control and wind management. For instance, the data analytics platform herein may calculate a transmission delay each time sensor data is received from a vehicle. The transmission delay may be determined based on vehicle location, vehicle speed, communication protocols employed, communication interfaces used, and so forth. The calculated transmission delays may be added to a transmission delay database maintained by the data analytics platform and can then be used for crosswind detection, updating wind maps, local map construction, and vehicle control based on some or all this information.

For discussion purposes, some example implementations are described in the environment of a vehicle that receives crosswind information from a service computing device to improve control and safety of the vehicle when encountering crosswinds, as well as a data analytics platform that receives data from vehicles and other sources, and generates databases that can be used for providing crosswind-related information to vehicles in real time. However, implementations herein are not limited to the particular examples provided, and may be extended to other types of vehicles, other types of communications, other types of computing device configurations, other types of computing platforms and architectures, and so forth, as will be apparent to those of skill in the art in light of the disclosure herein.

FIG. 1 illustrates an example system 100 for wind and transmission delay management according to some implementations. The system 100 includes a plurality of vehicles 102, each having one or more vehicle computing devices 104 able to communicate wirelessly over one or more networks 106 with one or more service computing devices 108. In the illustrated example, vehicles 102(a)-102(e) are shown. For example, vehicles 102(a), 102(b), and 102(d) are passenger cars, while vehicles 102(c) and 102(e) are vans or trucks having a larger side surface area than the passenger cars. In some examples herein, the vehicles 102 may be referred to as "connected vehicles" since they are connected for communication with one or more off-vehicle computing devices, such as the service computing devices 108, the computing devices of other vehicles 102, and/or other computing device (not shown in FIG. 1).

The vehicles 102 can be any type of vehicle, such as automobiles, pickup trucks, sport utility vehicles, motorcycles, vans, box trucks, tractor-trailers, or the like, For example, the vehicles may be electric vehicles (EVs), hybrid vehicles, internal combustion engine (ICE) vehicles, or the like. In some cases, the vehicles 102 may be fully autonomous driving (AD) vehicles, while in other cases, the vehicles may be operated by a human, and may include various levels of advanced driver assistance systems (ADAS), such as automatic braking, lane maintaining assistance, adaptive cruise control, and the like. In addition, the vehicles 102 may be able to communicate with the service computing devices 108 over the one or more networks 106, such as for sending information related to crosswinds 110 (represented in FIG. 1 by the group of diagonal arrows) to the service computing devices 108 and/or receiving information related to the crosswinds 110 from the service computing devices 108.

The vehicles 102 may be equipped with various different types of sensors and actuators (not shown in FIG. 1). These sensors may include a satellite positioning system receiver, inertial measurement unit (IMU), compass, camera systems (e.g., 360 degree view system, stereo camera(s), lane-keeping camera(s), and the like), lidar, radar, semi-active or active suspension systems with height sensors, or the like. Further, the actuators may also include various sensors, feedback loops, dedicated or general-purpose electronic control units (ECUs), and the like, such as braking control, powertrain control, steering control, battery management (e.g., in the case of an EV for controlling motor speed and/or a regenerative braking system) and so forth. In addition, the vehicles 102 may also be capable of at least one of the following functions: a) sharing data to other vehicles 102 and/or the service computing devices 108; b) receiving data from other vehicles and/or the service computing devices 108; and/or c) controlling the vehicle motions or functions through braking, powertrain operation, steering, and the like.

The one or more networks 106 provide a data transmission layer that enables data communication between the vehicles 102 and the service computing devices 108, which may provide a data analytics platform. The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH® or DSRC (dedicated short-range communications); a wired network, including fiber optics and Ethernet; any combination of the foregoing, or any other suitable communication network. For instance, typically, a vehicle 102 may access the one or more networks via a nearby cell tower 112, but implementations herein are not limited to any particular communication technology. Further, components used for such communication technologies can depend at least in part upon the type of network, the environment in which the vehicle 102 is located, or both. Protocols for communicating over such networks are well known and will not be discussed herein in detail.

In the illustrated example, the service computing devices 108 may provide or may access a data analytics platform that may receive data from various sources and that may provide data to various connected vehicles 102. The data analytics platform receives sensor data from various vehicles 102, processes the data to get crosswind information and other related information on the road or surrounding environment of each vehicle 102, stores the collected data and processed data into different databases, and generates control signals, control information, and/or warning messages for vehicles 102 that are encountering crosswinds, or that are likely to encounter crosswinds in the near future.

Furthermore, vehicles and other objects near a target vehicle 102 may affect the impingement of crosswinds on the target vehicle 102, which may cause a difference in the effects that the crosswind has on the particular vehicle. For instance, in the example of FIG. 1 the vehicle 102(a) is shielded from the crosswinds 110 by the vehicle 102(c) and therefore will be much less affected by the crosswinds 110 than the vehicle 102(b), which is unshielded. Similarly, the vehicle 102(d) may be initially shielded from the crosswinds 110 by the vehicle 102(e), but as the vehicle 102(d) overtakes the vehicle 102(e), the front portion of the vehicle 102(d) becomes exposed directly to the crosswinds 110 thereby affecting the vehicle 102(d) more significantly.

For example, crosswinds can create an asymmetrical air flow-field around a vehicle 102, and can generate lateral forces and a yawing moment on the vehicle 102. These effects can turn and push the car away from its intended trajectory and can cause accidents. Therefore, side-wind sensitivity has to be taken into account by car manufacturers. The driving stability problem caused by crosswind is most pronounced on highways, interstates, motorways, bridges, and the like, due to the higher driving speeds on these roads, as well as the often open exposure of these roads to wind. According to some surveys, approximately 37,000 road accidents occurred in the last decade that were classified as caused by weather conditions, and strong winds or crosswinds were believed to represent about 5 percent of these accidents. For example, these types of accidents may occur on highways in hilly areas and near the coast area during monsoon seasons or the like.

In some cases, government agencies such as the US Department of Transportation (DoT) address this issue by placing crosswind warning signs or windsocks on roads and bridges to provide a warning to drivers traversing areas subject to frequent crosswinds. However, these signs or windsocks may have low visibility at night or in bad conditions, and thus drivers may be unaware of the presence of the windsocks, may fail to notice a windsock, or the like.

In the example of FIG. 1, vehicle onboard sensors may collect various different types of data during operation of the vehicles 102. Examples of the collected sensor data may include GPS location, IMU measurements, camera data, lidar data, radar data, suspension sensor data, vehicle speed and heading data, and the like. Before the vehicle sensor data 114 is sent to the data analytics platform at the one or more service computing devices 108, a timestamp based on a time determined from a satellite positioning system (e.g., GPS) is added to the data message.

Some examples herein include a time synchronization feature that calculates a data transmission delay (e.g., time of flight delay) between each vehicle 102 and the service computing device(s) 108, which may be different at different locations, for different Internet and/or cellular carriers, different vehicles, different times of day, different days of the year, and so forth. In conventional systems, a timestamp may typically be generated based on a local CPU clock and these timestamps can sometimes be a source of errors since the local CPU clock may tend to drift over time. Therefore, to generate more accurate control information to provide specific vehicle control information to be executed at a specific time, examples herein may utilize timestamps that reference a GPS clock to calculate data transmission delays between vehicles and the data analytics platform.

After vehicle sensor data has been generated at the vehicles 102 and a timestamp based on GPS clock is appended to the data, the vehicle sensor data 114 is sent to the data analytics platform for further processing. For example, upon receipt of the vehicle sensor data 114, a second timestamp also based on the GPS clock may be associated with the received vehicle sensor data. The difference between these two timestamps can be used to calculate the data transmission delay for this vehicle 102 at this location and at this time of the day, and which may also take into consideration various other factors, such as vehicle speed, cellular carrier, communication protocols, and the like, as discussed additionally below. The delay information may be added to a delay information database 116.

Additionally, the vehicle sensor data 114 may include a vehicle identifier (ID) or the like to enable the system to determine the vehicle from which the sensor data is received, and to enable the data analytics platform to send vehicle specific information back to the vehicle when appropriate, such control or warning information when the vehicle is predicted to encounter crosswinds that may affect the vehicle's safety, the occupant's comfort, or the like. For example, when a vehicle 102 first begins using the system 100, the vehicle 102 may provide vehicle information to the data analytics platform such as the vehicle make, model, year of manufacture, whether the vehicle is equipped with AD or ADAS components, types of sensors on board the vehicle, and any of various other types of vehicle information such as powertrain information, suspension information, driver/owner information, and so forth. The data analytics platform may store this vehicle information in a vehicle database 122 in association with the vehicle ID so that the vehicle information can be accessed when sensor data including the corresponding vehicle ID is received. Alternatively, in other examples, such as in the case that anonymity of certain vehicles 102 is desired, the vehicle might only provide sensor information to the data analytics platform, and may receive only generalized crosswind warning information from the data analytics platform, such as based on the location of the vehicle.

The sensor information in the vehicle sensor data 114 may be used to calculate wind information and, particularly, crosswind information (e.g., direction, magnitude), as well as surrounding environments of the vehicles and other information, as discussed below. For example, a crosswind management program 118 executing on the one or more service computing devices 108 may perform the functions attributed to the service computing devices 108 herein. The calculated wind information may be saved into a wind information database 120, which maintains the crosswind information dynamically. Utilizing the wind information database 120 and the transmission delay information database 116, when vehicles passing through areas affected by crosswinds, and based on a particular vehicle's GPS location and trajectory, the crosswind management program 118 may determine and send vehicle control information 124 for instructing the vehicle how to respond to the crosswinds at the location of the particular vehicle 102 (e.g., brake left side wheels with certain forces at a specified time, or for a specified number of seconds, or at a specified location for a specified distance, and so forth). Accordingly, the vehicle control information 124 may be generated at the service computing devices 108 and sent to the specific vehicle 102 over the one or more networks 106, such as based on the vehicle ID and information determined from the vehicle database 122, or the like. In the meanwhile, the vehicle 102 may still be collecting sensor data and sending the vehicle sensor data 114 to the service computing devices 108 for further processing, e.g., calculation of data transmission delay and effectiveness of the control information in compensating for the effects of the crosswind. Thus, in some cases, the service computing devices 108 may receive real-time feedback from the particular vehicle, and may provide real-time or near-real-time updates to the vehicle control information 124, depending on the amount of the transmission delay between the vehicle 102 and the service computing devices 108.

Figure 2:
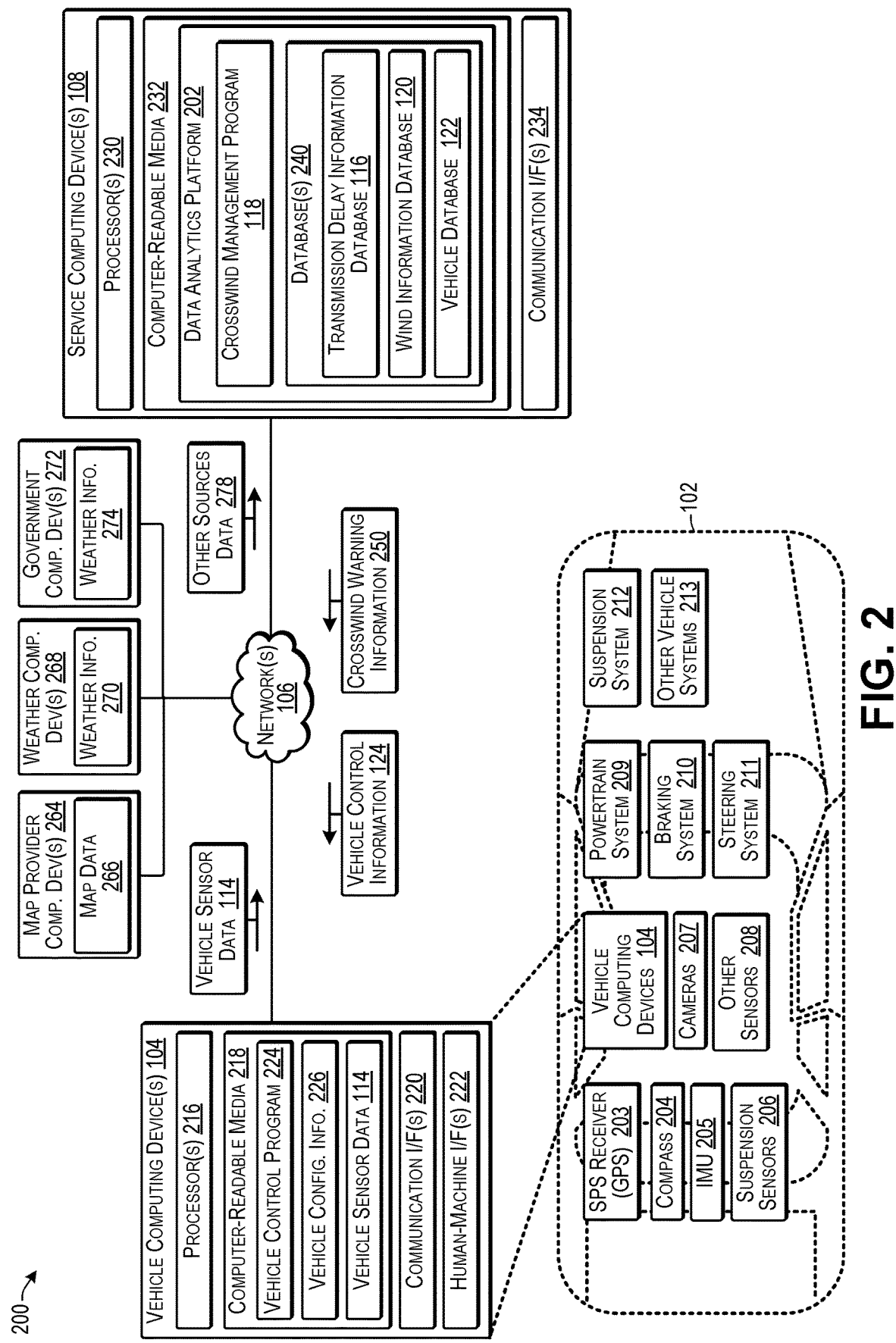
FIG. 2 illustrates an example hardware and logical configuration of portions of the system for wind and transmission delay management according to some implementations.

FIG. 2 illustrates an example hardware and logical configuration 200 of portions of the system 100 for wind and transmission delay management according to some implementations. As discussed above with respect to FIG. 1, the system 100 includes at least one vehicle 102 having one or more vehicle computing devices 104 able to communicate wirelessly over the one or more networks 106. For example, the vehicle computing devices 104 may communicate over the one or more networks 106 with the a data analytics platform 202 provided by the one or more of the service computing devices 108.

The example vehicle 102 of FIG. 2 includes a plurality of vehicle sensors and vehicle systems. As mentioned above the vehicles 102 herein may be conventional ICE vehicles, hybrid vehicles, or pure EVs, and may range from level 1 to level 5 autonomy. As is known in the art, level 1 vehicles may have no autonomous features while level 5 vehicles may have full autonomous driving capability, with levels 2-4 having varying and increasing amounts of ADAS features.

In the illustrated example, the vehicle 102 includes a plurality of sensors and vehicle systems such as an SPS (satellite positioning system, e.g., GPS) receiver 203, a compass 204, an IMU 205, suspensions sensors 206, cameras 207, and other sensors 208. For example, the suspension sensors 206 may indicate a change in height of the suspension system, such as in the case of a semi-active or active suspension system, or the like. For example, if a crosswind is blowing on one side of the vehicle, the suspension system on that side might be raised, while the suspension system on the opposite side may be compressed. This difference in heights of the suspension system on either side of the vehicle can be measured by the suspension sensors 206 and can provide an indication of the strength of the crosswind (assuming that other navigation maneuvers such as cornering, braking, etc., are not also concurrently detected. The other sensors 208 may include any of a plurality of additional sensors such as lidar, radar, ultrasound, proximity sensors, and so forth.

The vehicle systems illustrated in this example include a powertrain system 209, a braking system 210, a steering system 211, a suspension system 212, and other vehicle systems 213. Examples of the other vehicle systems 213 may include an electrical system, a safety system, an information/entertainment system, an instrument system, a fuel supply and/or battery system, and so forth. Additionally, the vehicle sensor data 114 may include information received from or associated with various vehicle systems 209-213, such as from a suspension controller associated with the suspension system 212, a steering controller associated with the steering system 211, a vehicle speed controller associated with the braking system 210 and/or the powertrain system 209, and so forth.

Each vehicle computing device 104 may include one or more processors 216, one or more computer-readable media 218, one or more communication interfaces (I/Fs) 220, and one or more vehicle human-machine interfaces (I/Fs) 222. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 209-213, such as to perform ADAS and/or AD tasks, such as navigation, braking, steering, acceleration, deceleration, and so forth. The computing device(s) 104 may also include one or more other ECUs, such as for controlling the systems 209-213 of the vehicle 102, the sensors 203-208, and so forth.

"ECU" is a generic term for any embedded processing system that controls one or more of the systems, subsystems, or components in a vehicle. Software, such as a vehicle control program 224 and other vehicle programs (not shown in FIG. 2) may be executed by one or more ECUs and may be stored in a portion of the computer-readable media 218 (e.g., program ROM, solid state storage, etc., as discussed below) associated with the respective ECU to enable the ECU to operate as an embedded system. ECUs on a vehicle may typically communicate with each other over a vehicle bus, such as a CAN bus, according to a vehicle bus protocol. However, implementations herein are not limited to such.

Each ECU or other vehicle computing device 104 may include one or more processors 216, which may include one or more of central processing units (CPUs), graphics processing units (GPUs), microprocessors, microcomputers, microcontrollers, system-on-chip processors, digital signal processors, state machines, logic circuits, artificial intelligence processing units, and/or any devices that manipulate signals based on operational instructions. As one example, the processor(s) 216 may include one or more hardware processors and/or logic circuits of any suitable type specifically programmed or configured to execute the algorithms and other processes described herein. The processor(s) 216 may be configured to fetch and execute computer-readable instructions stored in the computer-readable media 218, which may program the processor(s) 216 to perform the functions described herein.

The computer-readable media 218 may include volatile and nonvolatile memory and/or removable and non-removable media implemented in any type of technology for storage of information, such as computer-readable instructions, data structures, programs, program modules, and other code or data. For example, the computer-readable media 218 may include, but is not limited to, RAM, ROM, EEPROM, flash memory or other memory technology, optical storage, solid state storage, magnetic disk, network-attached storage, cloud storage, or any other medium that can be used to store the desired information and that can be accessed by a computing device. Depending on the configuration of the vehicle computing device(s) 104, the computer-readable media 218 may be a tangible non-transitory medium to the extent that, when mentioned, non-transitory computer-readable media exclude media such as energy, carrier signals, electromagnetic waves, and/or signals per se. In some cases, the computer-readable media 218 may be at the same location as the vehicle computing device 104, while in other examples, a portion of the computer-readable media 218 may be remote from the vehicle computing device 104.

The computer-readable media 218 may be used to store any number of functional components that are executable by the processor(s) 216. In many implementations, these functional components comprise instructions or programs that are executable by the processor(s) 216 and that, when executed, specifically program the processor(s) 216 to perform the actions attributed herein to the vehicle computing device 104. Functional components stored in the computer-readable media 218 may include the vehicle control program 224, which may include one or more computer programs, applications, executable code, or portions thereof. Further, other programs not shown may also be included in the computer readable media 218, and executed by the one or more processors 216.

In addition, the computer-readable media 218 may store data, data structures, machine-learning models, and other information used for performing the functions and services described herein. For example, the computer-readable media 218 may store vehicle configuration information 226, which includes information about the vehicle 102, such as powertrain configuration information, suspension information, tire information, as well as vehicle brand, model, year, trim level, and the like. Additionally, the computer-readable media 218 may store, at least temporarily, the vehicle sensor data 114 received from the onboard sensors 203-208.

Further, while the functional components, data and data structures are illustrated together in this example, during use, some or all of these elements may be stored on or by separate ones of the computing device(s) 104. The computing device(s) 104 may also include or maintain other functional components and data, which may include programs, drivers, etc., and the data used or generated by the other functional components. Further, the computing device(s) 104 may include many other logical, programmatic, and physical components, of which those described above are merely examples that are related to the discussion herein.

The one or more communication interfaces 220 may include one or more software and hardware components for enabling communication with various other devices, such as over the one or more network(s) 106. For example, the communication interface(s) 220 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, vehicle-to-vehicle, and the like, as additionally enumerated elsewhere herein.

In some examples, the vehicle control program 224 may enable autonomous driving of the vehicle 102, and may use rule-based and/or artificial-intelligence-based control algorithms, or any combination thereof, to determine parameters for vehicle control. For instance, the vehicle control program 224 may determine an appropriate action, such as braking, steering, accelerating, or the like, and may send one or more control signals to one or more vehicle systems 209-213 based on the determined action. For example, the vehicle control program 224 may send control signals to the suspension controller, the steering controller, and/or the vehicle speed controller for controlling or partially controlling the vehicle in some applications. Additionally, the vehicle control program 224 may receive control information 124 from the service computing devices 108 which may cause the vehicle control program 224 to control the vehicle 102 based on the crosswind information included with the vehicle control information 124 to more safely traverse an area that includes crosswinds.

The human-machine interface(s) 222 may include any suitable type of input/output devices, such as buttons, knobs, joysticks, touchscreens, speakers, microphones, voice recognition and artificial speech technology, in-cabin sensors, such as eye monitoring cameras, vital sign monitors, and so forth. As one example, a vehicle occupant may use the human-machine interface 222 to indicate a destination location, such as via voice command or touchscreen inputs. Implementations herein are not limited to any particular type of human-machine interfaces 222.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing devices 108 as being present in a single location, these components and data may alternatively be distributed across different computing devices and different locations in any desired manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 230, one or more computer-readable media 232, and one or more communication interfaces 234. Each processor 230 may be a single processing unit or a number of processing units, and may include single or multiple computing units or multiple processing cores. The processor(s) 230 can be implemented as one or more microprocessors, microcomputers, microcontrollers, digital signal processors, central processing units (CPUs), graphics processing units (GPUs), system-on-chip processors, state machines, logic circuits, artificial intelligence processing units, and/or any devices that manipulate signals based on operational instructions. For instance, the processor(s) 230 may be one or more hardware processors and/or logic circuits of any suitable type specifically programmed or configured to execute the algorithms and processes described herein. The processor(s) 230 can be configured to fetch and execute computer-readable instructions stored in the computer-readable media 232, which can program the processor(s) 230 to perform the functions described herein.

The computer-readable media 232 may include volatile and nonvolatile memory and/or removable and non-removable media implemented in any type of technology for storage of information, such as computer-readable instructions, data structures, program modules, or other data. Such computer-readable media 232 may include, but is not limited to, RAM, ROM, EEPROM, flash memory or other memory technology, optical storage, solid state storage, magnetic tape, magnetic disk storage, storage arrays, network-attached storage, storage area networks, cloud storage, or any other medium that can be used to store the desired information and that can be accessed by a computing device. Depending on the configuration of the service computing device 108, the computer-readable media 232 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 232 may be used to store any number of functional components that are executable by the processors 230. In many implementations, these functional components comprise instructions or programs that are executable by the processors 230 and that, when executed, specifically configure the one or more processors 230 to perform the actions attributed above to the service computing device 108. For example, the functional components may together provide a data analytics platform 236 that provides the functions attributed to the service computing devices 108. Functional components stored in the computer-readable media 232 may include the crosswind management program 118 that may be executed to configure the service computing devices 108 to receive the vehicle sensor data 114 as well as other sources data 238 that may be used for calculating crosswind information individual vehicles 102, and further determining corresponding vehicle control information 124 for the respective individual vehicles.

In addition, the computer-readable media 232 may store or access data used for performing the operations described herein. Further, in some examples, the data may be stored in any suitable type of data structures, such as in one or more databases 240. Examples of databases 240 may include the transmission delay information database 116, the wind information database 120, and the vehicle database 122. For example, the wind information database 120 may include dynamically determined crosswind information for specific geographic locations. In addition, the transmission delay information database 116 may include information regarding the transmission delays that may exist in communications between the service computing devices 108 and specific vehicles at specific locations. In addition, the vehicle data database 262 may include information about each vehicle that uses the system 100, which may include vehicle ID information to use for communicating with a specific vehicle 102, as well as sensor configuration information, vehicle configuration information, past destinations of the vehicle or vehicle occupants, information about an owner or other occupant associated with the vehicle, such as an occupant profile including occupant information and preferences, and so forth.

Further, the service computing device 108 may also include or maintain other functional components, data, and data structures not specifically shown in FIG. 2, which may include programs, drivers, etc., and the data used or generated by the functional components. Additionally, the service computing device 108 may include many other logical, programmatic, and physical components, of which those described above are merely examples that are related to the discussion herein.

The communication interface(s) 234 may include one or more interfaces and hardware components for enabling communication with various other devices, such as over the network(s) 106. For example, communication interface(s) 234 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, DSRC, and the like, as additionally enumerated elsewhere herein.

In addition, the service computing device(s) 108, and in some cases, the vehicle computing device(s) 104 may be able to communicate over the one or more networks 106 with one or more information source computing devices, such as web servers, service provider computing devices, public databases, private databases, or the like. Information source computing devices illustrated in this example include one or more map provider computing device(s) 264 that may provide map data 266 to the service computing devices 108 and/or to the vehicle computing devices 104. Additionally, one or more weather computing devices 268 may provide weather information 270 about current weather conditions at various locations at which specific vehicles are located. Further, one or more government computing devices 272 may provide weather conditions as well as other government data 274, such as road information, department of motor vehicle information, national department of transportation information, ongoing construction information, locations where crosswinds have caused accidents in the past, and so forth. The information source computing device(s) 264, 268 and 272 may provide other sources data 278, such as publicly available wind data that is updated periodically, as well as map data that may be used for determining locations, such as based on longitude and latitude information.

The information source computing device(s) 264, 268 and 272 may include hardware and software configurations similar to the service computing devices 108 described above, but with different functional components and data stored thereon or associated therewith. Further, while several types of information source computing devices are described herein, numerous other types of information source computing devices may provide information to the service computing devices 108 and/or the vehicle computing devices 104. For example, the information source computing devices may provide local condition data to the service computing device(s) 108 for indicating the current conditions of specified road segments, such as with respect to weather conditions, traffic, road closures, special events, and so forth.

To realize the benefits of connected vehicle technologies for partially/fully autonomous vehicles, the connected data analytics platform 202 may receive various different types of the data from various different sources such as the vehicles 102, the government computing devices 272, the weather computing devices 268, and the map provider computing devices 264, as discussed above. The data analytics platform 202 may process the received data to determine crosswind information for specific vehicles 102, and corresponding vehicle control information 124 that is based on the crosswind information, at least in part. Techniques for determining the crosswind information and the corresponding control information, including suitable algorithms are discussed additionally below.

The vehicle computing device 104 may receive the vehicle control information 124 from the service computing devices 108 and may use the received vehicle control information 124 for controlling the vehicle when crosswinds are encountered. Furthermore, the vehicle computing device may also be able to detect crosswinds independently of the data analytics platform 202 by using the onboard suspension sensors and other onboard sensors. For example, the vehicle computing device 104 may receive the vehicle control information indicating that crosswinds are present or will be encountered in the near future, and when the vehicle sensors confirm that crosswinds are impinging on the vehicle, the vehicle control program 224 may apply the received vehicle control information 124 for controlling the vehicle during the crosswind event. For example, if the crosswind direction is from the left side of the vehicle, to compensate for the wind force, the vehicle control program may apply the brakes on the left side of the vehicle to compensate for the effects of the crosswind. On the other hand, if the wind direction is from the front side of the vehicle, i.e., a headwind, then to maintain vehicle speed, the powertrain of the vehicle may be used to compensate for the headwind/ crosswind currently being encountered by the vehicle to maintain the vehicle speed.

As another example, if the wind direction is blowing to the fore the rear side of the vehicle, the powertrain of the engine of the vehicle may be controlled to compensate for the tailwind, or, in the case of an EV, regenerative braking may be applied for time of simultaneously charging the vehicle battery. Additionally, as not all vehicles are equipped with sensor systems and actuators illustrated in this example, such as in the case of level I and level II vehicles, the data analytics platform 202 may generate warning messages for the vehicle appropriate for the particular configuration of the vehicle. For example, if the vehicle only has a partial sensing systems, instead of the vehicle control information 124 being sent to the vehicle, the data analytics platform may send crosswind warning information 250, including control instructions to the vehicle operator such as indicating that a crosswind will be encountered on the left side of the vehicle for the next mile, and recommendation to decrease vehicle speed, or the like. For instance, the warning information 250 may be presented on the vehicle human machine interface 222, or, alternatively, on a smartphone or other personal computing device of the operator such as through an application executing on the personal computing device.

In some examples herein, the vehicle computing device 104 may provide, to the service computing device 108, source and destination information for a trip. For example, the vehicle control program 224 or other suitable program may be executed by the vehicle computing device 104 to send to the service computing device 108 the source location and destination location for desired travel. Alternatively, in other examples, the vehicle computing device 104 may merely provide current location information to the service computing device 108 and may request a route from the service computing device 108. In response, the service computing device 108 may predict a destination location, such as based on a current time, current location, and an analysis of past trips made by the vehicle 102. As still another example, the service computing device 108 may send a communication to cause the human machine interface 222 to query the vehicle occupant as to a destination location. In any event, the data analytics platform may provide the vehicle with crosswind management information as the vehicle progresses along the route, which may include vehicle control information 124 and/or crosswind warning information 250. For example, in the case that the vehicle does not accommodate vehicle control information 124, the driver of the vehicle may be presented with crosswind warning information on a vehicle display provided by the human-machine interface 222, or on a personal computing device, such as a smartphone or tablet, or the like, executing an application configured to receive communications from the data analytics platform 202.

FIGS. 3, 6-9 and 11 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 3:
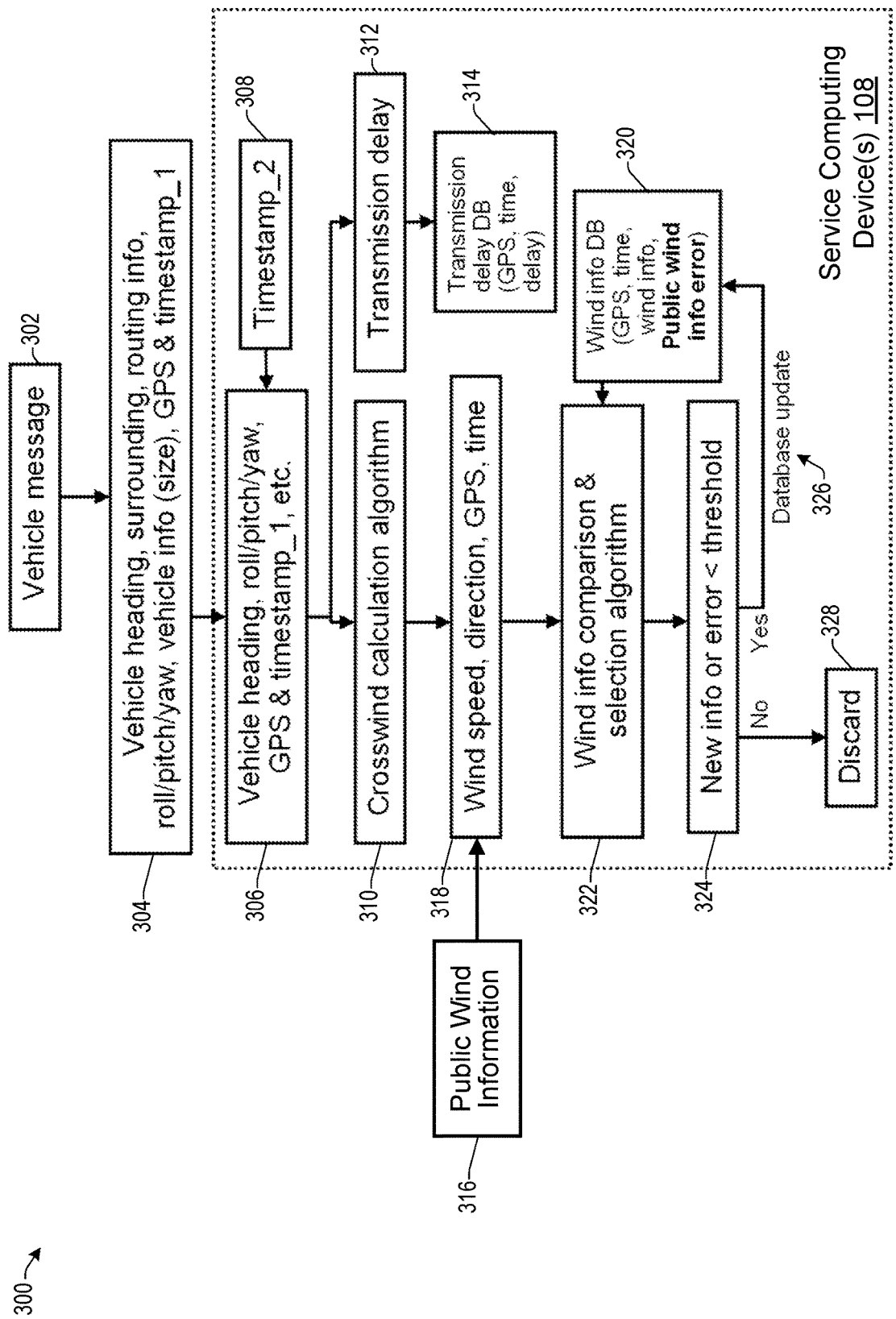
FIG. 3 is a flow diagram illustrating an example process for updating the crosswind database and the transmission delay database according to some implementations.

FIG. 3 is a flow diagram illustrating an example process 300 for updating the crosswind database and the transmission delay database according to some implementations. In some examples, the process 300 may be executed by the system 100 discussed above. For example, the process 300 may be executed at least in part by the service computing device 108 executing the crosswind management program 118. Additionally, or alternatively, the process 300 may be executed in part by the vehicle computing device 104.

Crosswinds can be highly dynamic weather events with fast changing magnitudes and/or directions. Accordingly, maintaining a crosswind database with accurate wind information in terms of wind speed, direction, location, and time is useful to avoid accidents caused by sudden drifting of vehicles. The process 300 sets forth a technique for receiving sensor data from vehicles and updating the wind information database and the transmission delay database, such as described above with respect to FIGS. one and two.

At 302, a vehicle may share its vehicle sensor data in at least one electronic message sent to the data analytics platform provided by the service computing devices as discussed above with respect to FIGS. 1 and 2.

At 304, the vehicle sends the vehicle sensor data to the service computing device. The vehicle sensor data may include vehicle heading information, surrounding environment information (e.g., determined from lidar, radar, cameras, or the like), routing information, IMU data and suspension sensor data (e.g., for determining roll/pitch/yaw of the vehicle), GPS data, and a timestamp based on the GPS clock. Further, in some examples, the vehicle may also share vehicle configuration information to the service computing device if that information is not already retained by the data analytics platform in the vehicle database. Based on size of the vehicle sensor data and/or the frequency at which the vehicle sensor data is sent to the data analytics platform, different data transmission protocols might be employed for performing the transmission of the vehicle sensor data from the vehicle to the service computing device. Examples of protocols that may be employed include message queue telemetry transport (MQTT), Kafka, HTTPs, TCP/IP etc.

At 306, the service computing device receives the vehicle sensor data sent by the vehicle.

At 308, the service computing device associates a second timestamp with the received vehicle sensor data.

At 310, the service computing device provides the received sensor data to a crosswind calculation algorithm. Additional details of the crosswind calculation algorithm are discussed below, e.g., with respect to FIG. 6.

At 312, the service computing device also provides at least the first and second timestamps and the vehicle location and vehicle ID to the transmission delay algorithm. Based on the difference between the two timestamps, the data transmission delay from the vehicle at the current location and using the current network connection is calculated.

At 314 the service computing device updates the transmission delay database with the calculated transmission delay information, the vehicle location information, and other vehicle information. FIG. 4 illustrates an example data structure of a portion of a transmission delay database.

At 316, the service computing device receives or otherwise accesses public wind information for use by the crosswind calculation algorithm.

At 318, the service computing device applies the crosswind calculation algorithm to determine a wind speed, wind direction, wind location, and associated time. In addition, the crosswind calculation algorithm may also use the received vehicle sensor data to determine information related to the environment surrounding the vehicle.

At 320, the service computing device accesses the crosswind information database to obtain prior wind information for the corresponding GPS location and an associated time, wind speed, wind direction, public wind information in error, and so forth.

At 322, the service computing device executes a wind information comparison and selection algorithm based on the public wind information received at 316, the wind information determined at 318, and the wind information maintained in the wind mapping database at 320. For example, the public wind information may be used to ensure that the calculated wind information determined from the sensor data is not anomalous or an outlier. This wind measurement difference ("public wind info error" in the data structure of FIG. 5) may be saved to the wind information database. For example, based on the GPS location associated with the vehicle sensor data, the public wind data from online wind maps can be obtained which are mainly based on simulation and typically updated periodically based on actual wind measurement data from government or other available wind databases that rely on wind measurement equipment. The wind information measurements from the government sources may be updated relatively slowly, e.g., hourly, and may be extrapolated or otherwise simulated to other geographic areas. Accordingly, the actual measurements at various locations are sparse, and how the public measurement data is calculated may not be entirely transparent (e.g., based on average wind speed in the past certain time or at current time). However, the wind data based on simulation from the online databases can be used as a reference for comparison with the calculated wind information determined from the vehicle sensor data.

At 324, the computing device determines whether the received wind information at 318 is new information or an error that is less than a threshold. If the newly determined wind information varies from the wind information from the public databases by less than a threshold amount, the process goes to 326. If not, the process goes to 328.

At 326, when the calculated wind information differs from the public wind information by less than the threshold the wind crosswind information database is updated with the new wind information.

At 328, on the other hand, when the newly calculated wind information differs from the public wind information by more than the threshold, the newly calculated wind information is discarded.

FIG. 4 illustrates an example data structure 400 of information included in the transmission delay database according to some implementations. In this example, the data structure 400 includes latitude 402, longitude 404, protocol 406, data size 408, vehicle ID 410, cellular type 412, vehicle speed 414, timestamp 416, and average delay 418. For example, the latitude 402 and longitude 404 indicates the location at which the sensor data was collected and/or sent. The protocol 406 indicates the communication protocol used by the vehicle computing device to send the vehicle sensor data to the service computing devices. The data size 408 indicates the size of the vehicle sensor data sent to the service computing devices. The vehicle ID 410 identifies the vehicle that sent the vehicle sensor data. The cellular type 412 indicates the cellular technology used by the vehicle computing device to transmit the vehicle sensor data to the service computing devices. The vehicle speed 414 indicates how fast the vehicle was traveling when the vehicle sensor data was collected. The timestamp 416 indicates the GPS clock timestamp received with the vehicle sensor data. As mentioned above, the delay is the amount of delay in milliseconds between the timestamp 416 received with the vehicle sensor data and the timestamp corresponding to when the vehicle sensor data was received by the service computing devices. Accordingly, the average delay 418 is the average of a plurality of delays determined for this location for a plurality of transmissions received from a plurality of vehicles traveling through this location and which vehicles may have the same data transmission protocol, same approximate data size, same cellular type, same approximate vehicle speed at the location, and so forth.

FIG. 5 illustrates an example data structure 500 of information included in the wind map database according to some implementations. In this example, the data structure 500 includes latitude 502, longitude 504, wind speed 506, wind direction 508, the vehicle ID 510, vehicle heading 512, vehicle speed 514, lane number 516, timestamp 518, and error with simulation 520. For example, the latitude 502 and longitude 504 indicate the location at which the sensor data was collected and/or sent. The wind speed 506 indicates the wind speed measured by the vehicle when the vehicle sensor data was collected. The wind direction 508 indicates the direction in which the wind was blowing when detected by the vehicle. The vehicle ID 510 identifies the vehicle that sent the vehicle sensor data. The vehicle heading 512 indicates the direction in which the vehicle is traveling, such as may be determined from the compass, IMU, and/or GPS data. The vehicle speed 514 indicates how fast the vehicle was traveling when the vehicle sensor data was collected. The lane number 516 indicates in which lane the vehicle was traveling when the vehicle sensor data was collected. The timestamp 518 shows the timestamp that was received from the vehicle with the vehicle sensor data.

The error with simulation 520 indicates the difference between the measured wind data and the public wind data received from an external source, such as a government website, a weather website, or other website that provides periodic wind information updates for various geographic locations. For example, as mentioned above, based on the GPS location associated with the received vehicle sensor data, wind data from online wind maps can be obtained which is mainly based on simulation. For instance, the information might only be updated with actual wind data periodically on an hourly basis, and the measurement locations are sparse compared to the locations of the vehicles herein. However, implementations herein can use the wind data from the websites as a reference in cases where no actual wind measurement data is available in the wind information database herein.

Figure 6:
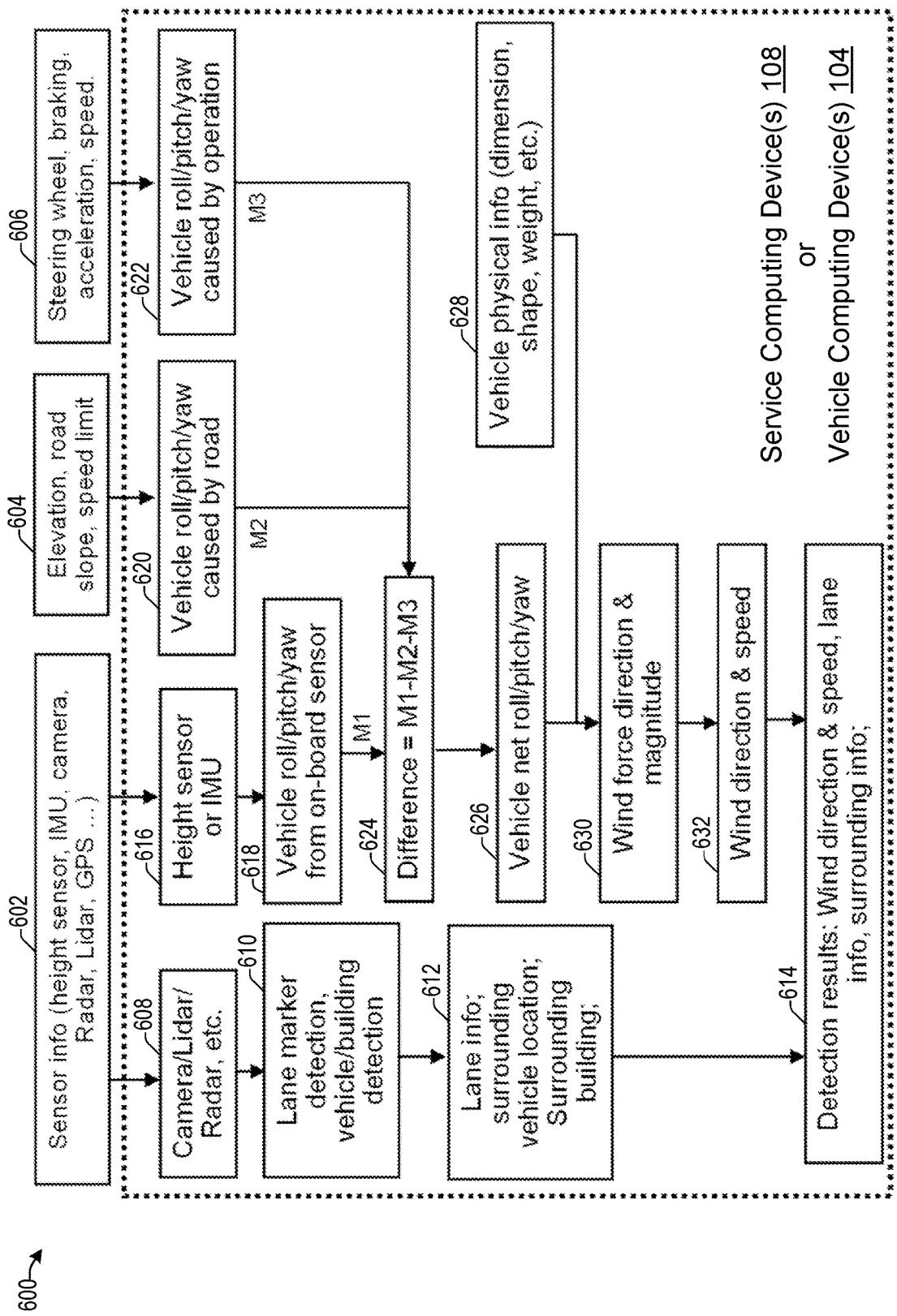
FIG. 6 is a flow diagram illustrating an example process for determining crosswind information and vehicle surroundings information according to some implementations.

FIG. 6 is a flow diagram illustrating an example process 600 for determining crosswind information and vehicle surroundings information according to some implementations. In some examples, the process 600 may be executed by the system 100 discussed above. For example, to determine wind information and vehicle surrounding environment, data from the vehicles 102, as well as the other sources data 278, as discussed above with respect to FIGS. 1 and 2 is used for determining wind direction, wind speed, vehicle lane information, vehicle surroundings, and the like.

In some cases, the process 600 may be executed by the service computing device(s) 108 executing the crosswind management program 118. For example, the vehicle data and other sources data can be sent to the data analytics platform for processing by the service computing devices 108. In this case, the vehicle should have sufficient transmission bandwidth for sending the sensor data to the service computing devices 108. Alternatively, in some examples, the process 600 may be executed by the vehicle control program 224 or other program executing on the one or more vehicle computing device(s) 104 of a particular vehicle 102. For example, processing of sensor data using an onboard ECU can greatly reduce the size of data transmitted and the time for data transmission to the cloud side. However, a powerful ECU may be required for fast data processing onboard the vehicle, which will consume more energy and increase vehicle cost. In yet other examples, the process 600 may be executed in part by the service computing device(s) 108 and in part by the vehicle computing device(s) 104, or by other computing devices. For instance, in a hybrid method, the vehicle computing device 104 may partially process some of the data (e.g., camera data) and then send the preprocessed data to the service computing devices 108 for further processing. For instance, the vehicle computing device may compress and/or reduce the resolution of at least one of camera data, lidar data, or radar data that is sent to the service computing devices 108 to reduce the size of the sensor data sent over the one or more networks 106.

Examples herein may determine the surrounding environment of the target vehicle, such as other vehicles around the target vehicle, the lane number in which the target vehicle is traveling, as well as buildings or road barriers, tunnels, geographic features, trees, and so forth. The vehicle sensor data such as camera data and/or lidar data, radar data, and the like, may be used by a machine learning algorithm (e.g., a YOLO model-You Only Look Once real-time object detection) or other conventional data processing algorithm to recognize objects like lane markers, buildings, barriers, other vehicles, etc. In addition, based on current vehicles GPS location, the relative or absolute locations of the target vehicle and the recognized objects can also be estimated and added to the final detection results.

For wind information determination based on vehicle sensing data, the suspension height sensor information and/or IMU information may be used for measuring vehicle body motion to determine current values for roll, pitch, and yaw of the vehicle body (referred to as M1 in FIG. 6). To remove environmental effects and turning effects on vehicle body motion when determining roll, pitch, and yaw, other data may also be used. For example, road elevation data, which can be used to calculate road slope and thus vehicle pitch angle may be determined (referred to as M2 in FIG. 6). In addition, the steering wheel angle and vehicle speed can be used to calculate vehicle yaw and roll, such as during turning. Vehicle acceleration and deceleration data can be used to calculate vehicle yaw angle (referred to as M3 in FIG. 6). Accordingly, the vehicle's net roll, pitch, and yaw angles can be calculated based on the following equation:

$$\text{Net}_{motion}i = M1_i - M2_i - M3_i \ (i=\text{roll,pitch,yaw}) \tag{1}$$

where $\text{Net}_{motion}$ is the vehicle net motion of roll, pitch and yaw. In addition, by taking into account vehicle information such as vehicle surface area, weight, weight center, and the like, the wind force magnitude and direction can thus be calculated from the following equation:

$$F = \frac{1}{2}\rho v^2 \tag{2}$$

where F is the wind load or force in Newton, p is air density which is 1.2 Kg/m$^3$, and v is wind speed in m/s. The relationship between F and vehicle roll, pitch, and yaw can be obtained from a lookup table based on experimental testing. With equations (1), and (2), crosswind direction and magnitude affecting the vehicle can thus be calculated. The final detection result is a combination of wind direction, wind magnitude, surrounding vehicles and their relative locations, other surrounding objects and their relative locations (e.g., buildings, barriers, etc.), and the like.

In the illustrated example of FIG. 6, suppose that the vehicle sensor data is sent to the service computing device(s) 108 for processing.

At 602, the computing device may receive sensor information such as suspension height sensor information, IMU information, camera data, radar data, lidar data, GPS location, and so forth, as already discussed elsewhere herein.

At 604, the computing device may also receive other data such as road elevation, road slope, speed limit, and so forth. For example, this information may be determined from mapping information and/or from other data such as vehicle sensor data.

At 606, the computing device may also receive vehicle sensor data that includes steering wheel position, braking information, acceleration information, current vehicle speed, and so forth.

At 608, the computing device may preprocess the camera data, lidar data, radar data, and other data that may be used for object recognition.

At 610, the computing device may perform object recognition on the received vehicle sensor data such as for recognizing lane markers, vehicles around the target vehicle, buildings near the target vehicle, geographic features in the target vehicle, and so forth. As mentioned above, in some examples, a YOLO model or other recognition model or algorithm may be used to perform the object recognition.

At 612, the computing device may determine lane information, surrounding vehicle locations, and surrounding buildings and other geographic features and the like based on the recognition results.

At 614, the computing device may provide the detection results as part of the output of the process 600 for further processing.

At 616, the computing device may access the suspension system height sensor and/or the IMU data.

At 618, the computing device may determine a first value M1 for vehicle roll, pitch, and yaw from the received suspension system sensor data and/or the IMU data.

At 620, the computing device may use the elevation information, road slope information, speed limit, and so forth for determining as a second value M2 the vehicle roll, pitch, and yaw caused by the road on which the target vehicle is traveling.

At 622, the computing device may use the steering wheel position indication, the braking indication, the acceleration indication, and the current vehicle speed to determine a third value M3 for vehicle roll, pitch, and yaw caused by vehicle operation.

At 624, the computing device may determine a difference based on subtracting M2 and M3 from the first value M1.

At 626, the computing device may determine the net motion for the vehicle based on the difference determined at 624, as discussed above with respect to equation (1).

At 628, the computing device may access the vehicle's physical information such as vehicle surface area, weight, center of gravity, and so forth.

At 630, the computing device may calculate the wind force direction and magnitude based on equation (2) discussed above.

At 632, the computing device may determine the wind direction and wind speed based on the relationship between the wind force F of equation (2) and the vehicle roll, pitch, and yaw determined from equation (1). The determined result is included with the detection results at 614 as part of the output of the process 600.

Figure 7:
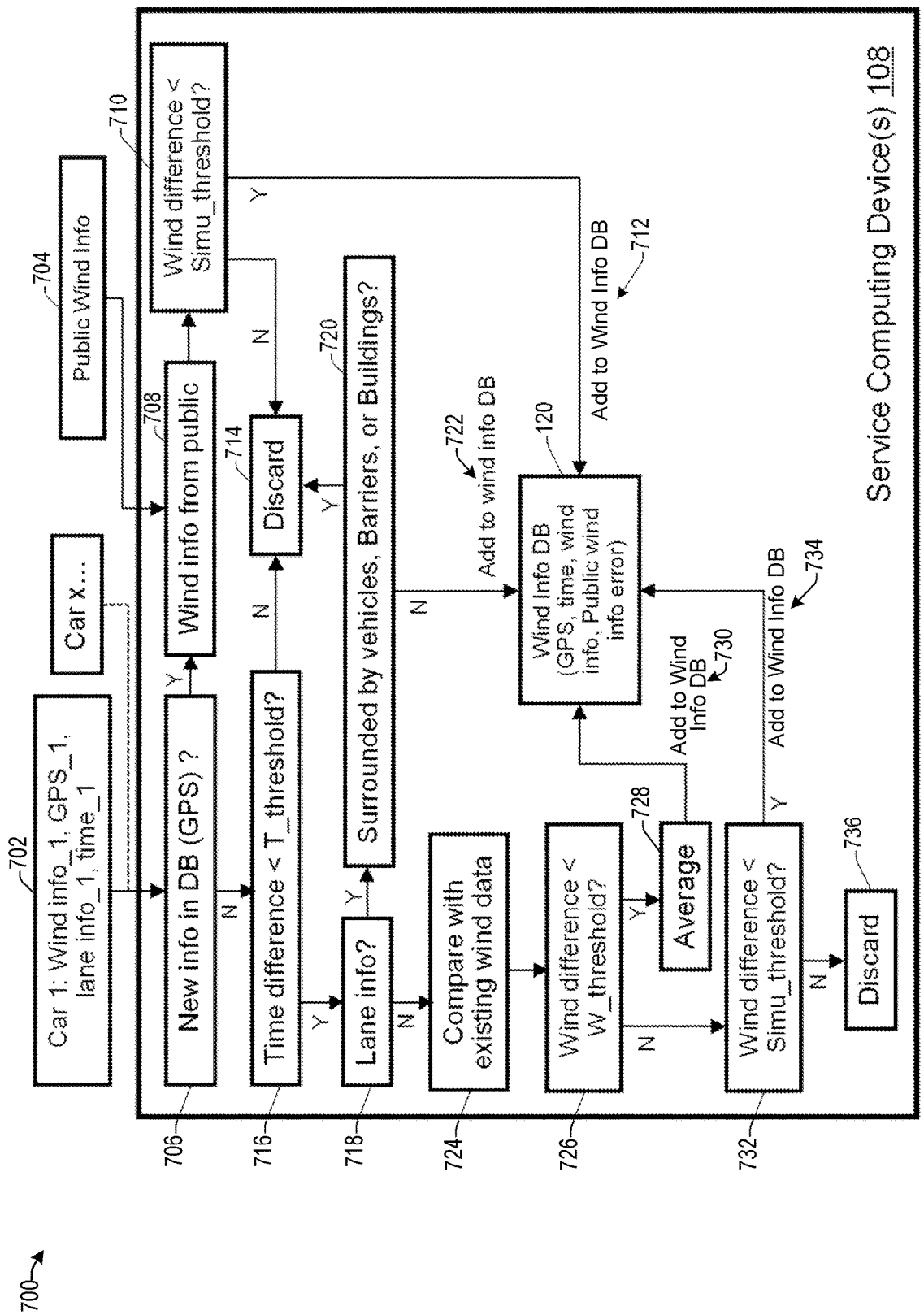
FIG. 7 is a flow diagram illustrating an example process for updating the wind information database according to some implementations.

FIG. 7 is a flow diagram illustrating an example process 700 for updating the wind information database according to some implementations. In some examples, the process 700 may be executed by the system 100 discussed above. For example, the process 700 may be executed by the service computing device 108 executing the crosswind management program 118.

When wind information has been calculated based on vehicle sensor data, such as discussed above with respect to FIG. 6, the wind information database 120 may be updated using the output of process 600 and according to the process 700 of FIG. 7. When the wind information is calculated and the associated GPS location is beyond a certain distance threshold of current GPS points in the wind information database 120, then the information is considered to apply to a new GPS point. Accordingly, the public wind information (e.g., based on simulation) is obtained based on the GPS location of the new data. If the difference between the detected wind information and the wind information from the public wind simulation data is below a threshold difference ("Simu_threshold" in FIG. 7), then the measurement data is added to the wind information database 120 together with other information, such as is shown in the data structure 500 of FIG. 5 discussed above. The purpose of this step is to minimize measurement errors from the vehicle side, which may be caused by other events, e.g., when one vehicle wheel runs over small rocks on the road causing roll or pitch angle changes. For example, if the difference is larger than the threshold difference, the data will be discarded. In addition, if the detection results determined based on the vehicle sensor data is not new in the wind information database 120 (e.g., the new data's GPS point is within a distance threshold of another GPS point already in the database 120), the data's timestamp may be compared with the already existing data's timestamp in the wind information database 120.

If the time difference is smaller than a time threshold, the detection results may be further checked as to whether there is lane information. If there is no lane information, the detected wind information may be compared with existing wind data for the same location, and if the difference is smaller than a wind threshold ("W_threshold" in FIG. 7), these two wind data points are averaged, and the final result is updated to the wind information database 120. However, if the difference between the two wind data points is larger than the wind threshold W_threshold, the detected wind information may then be compared with the public simulated wind information based on GPS location. If the difference between the calculated wind information and the publicly available wind information is larger than the threshold "Simu_threshold", the calculated wind information is discarded. Otherwise the calculated wind information is used to replace the current wind information in the wind information database 120.

At 702, the service computing device may receive, for a first vehicle, the output of the process 600 of FIG. 6 including wind information, GPS information, lane information, time information, and so forth. The service computing device may process vehicle information for individual vehicles one at a time, e.g., from 1 to x number of vehicles.

At 704, the service computing device may also receive public wind information, which often may be simulated wind information based on sparse data points collected over relatively long periods such as hourly or the like.

At 706, the service computing device may determine whether the received information is for a new GPS point. For example, when the calculated wind information is for a GPS location that is beyond a certain distance threshold from current GPS points in the wind information database, then the information is considered to apply to a new GPS point. If so, the process goes to 708. If not, the process goes to 716.

At 708, the service computing device may compare the wind information for the new GPS point with the public wind information received from one or more online sources for a similar GPS point to determine a wind difference.

At 710, the service computing device may determine whether the wind difference determined at 708 is less than the Simu_threshold (public wind information difference threshold). If less than, then the process goes to 712. If more than, then the process goes to 714.

At 712, the service computing device updates the wind information database 120 with the calculated wind information and other information received at 702.

At 714, the service computing device may discard the data received at 702, as the data may be inaccurate.

At 716, when the GPS information indicates that the location is not a threshold distance from at least one other entry already in the wind information database 120, the service computing device may determine whether a time difference between the received data and the data already in the database is less than the time threshold T_threshold. If not, the data is discarded at 714. If so, the process goes to 718.

At 718, the service computing device may determine whether the received data includes lane information. If so, the process goes to 720. If not, the process goes to 724.

At 720, the service computing device may determine whether the target vehicle is surrounded by one or more other vehicles, barriers, buildings, geographic features, or the like. If so, the process goes to 714 to discard the data. If not, the process goes to 722.

At 722, the data received at 702 is added to the wind information database 120.

At 724, when there is no existing lane information included with the received data, the service computing device may compare the received wind data with existing wind data in the database entry having the similar GPS location.

At 726 if the difference between the wind information is less than the wind threshold W_threshold, the process goes to 728. If not, the process goes to 732.

At 728, when the wind difference between the existing entry and the new data is less than the threshold W_threshold, the service computing device averages the received wind data with the existing entry wind data.

At 730, the service computing device adds the averaged wind data to update the existing entry in the wind information database 120.

At 732, when the wind difference is not less than the wind threshold W_threshold, the service computing device determines whether the wind difference is less than the public wind information threshold Simu_threshold. If so, the process goes to 734. If not, the process goes to 736.

At 734, when the wind difference is less than the public wind threshold, the data received at 702 is added to the wind information database 120.

At 736, on the other hand, when the wind difference is not less than the public wind threshold, the data received at 702 is discarded.

Figure 8:
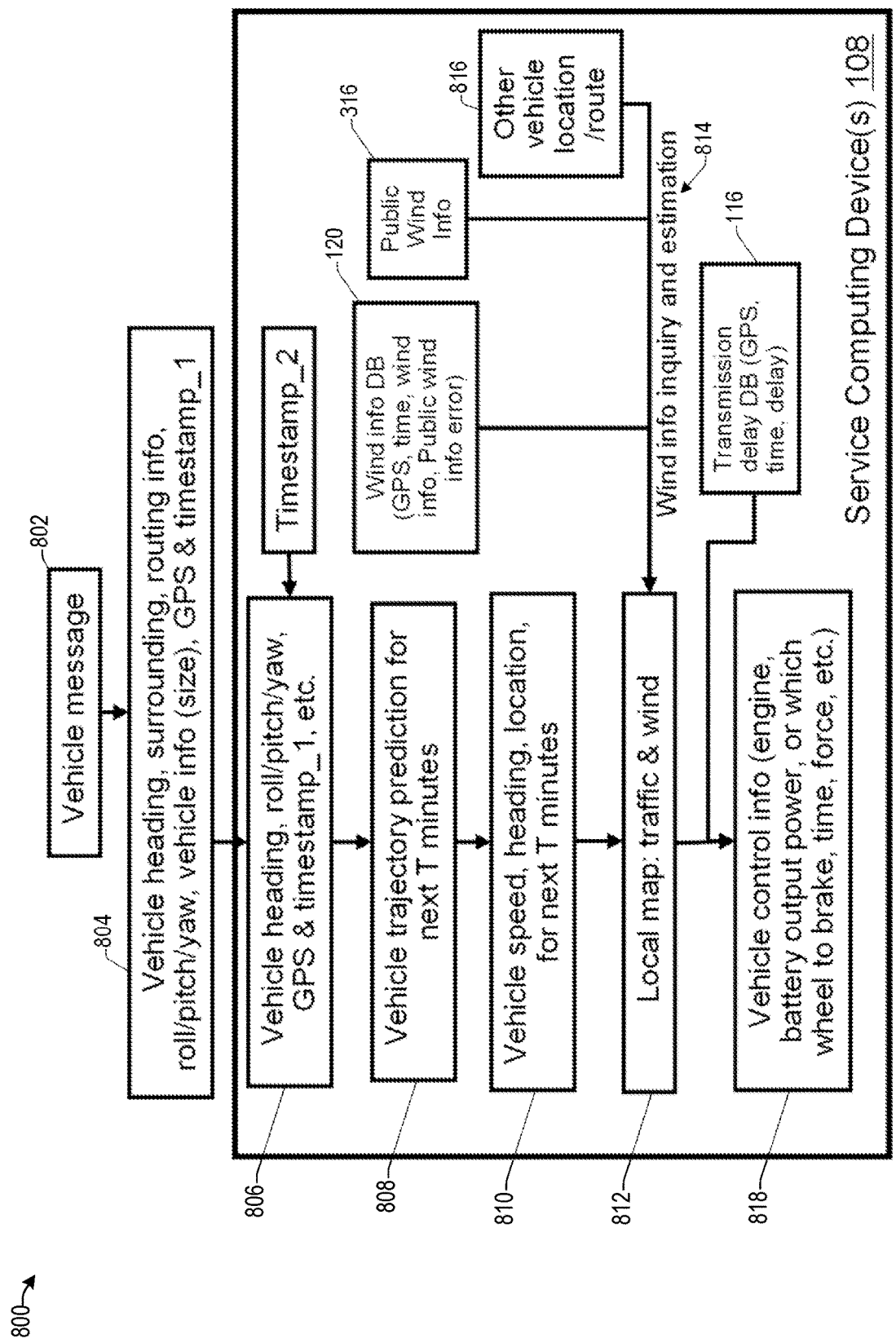
FIG. 8 is a flow diagram illustrating an example process for generating vehicle control information according to some implementations.

FIG. 8 is a flow diagram illustrating an example process 800 for generating vehicle control information according to some implementations. In some examples, the process 800 may be executed by the system 100 discussed above. For example, the process 800 may be executed by the service computing device 108 executing the crosswind management program 118.

As discussed above, the vehicle sensing data and other sources data may be used to construct the wind information database and the transmission delay database. These two databases may be used to generate vehicle control information to improve driving safety and comfort for a target vehicle when that vehicle is passing through the windy area. As discussed above, the vehicles may send various sensing data to the data analytics platform, which may include the vehicle routing information. Once the vehicle message including the vehicle sensor data and vehicle routing information is received by the data analytics platform, a second timestamp is associated with the received data, which is used to calculate the data transmission delay as discussed above. Additionally, based on the routing information, crosswind management program 118 may calculate vehicle trajectory waypoints (e.g., GPS points) that the vehicle is predicted to traverse over the next T minutes, as well as vehicle speed, heading, and vehicle GPS location. Based on the GPS waypoints on the predicted trajectory, a local map may be constructed that may include wind information and traffic information combined for each waypoint. Based on this local map, specific vehicle control information is generated to improve the vehicle motion, dynamics, driving safety, and/or comfort when traversing each waypoint. Additional details of constructing the local map and generating the vehicle control information are discussed below with respect to FIGS. 9 and 11.

At 802, the vehicle computing device may prepare a message to send to the data analytics platform on the service computing devices 108.

At 804, the vehicle computing device sends the message including vehicle heading, surroundings, routing information, roll, pitch, yaw information, vehicle ID, GPS information, and a first GPS timestamp.

At 806, the service computing device may receive the data from the vehicle and may associate a second timestamp with the received data to determine a delay in transmission.

At 808, the service computing device may use the received data to predict a vehicle trajectory for the target vehicle over the next T minutes.

At 810, the service computing device may predict the vehicle speed, heading, and location, for the next T minutes based in part on the vehicle trajectory prediction.

At 812, the service computing device may determine local map information including traffic and wind information for the local map. For instance, as indicated at 814, the service computing device may perform a wind information query and estimation by obtaining information from the wind information database 120, public wind information 316, as well as other vehicle locations and routes 816. Additional details of the local map generation are discussed below e.g. with respect to FIG. 9.

At 818, the service computing device may determine a transmission delay from the transmission delay database 116 and may determine vehicle control information for the target vehicle such as engine or battery output power, one or more wheels to break, at a particular time force etc. or the like. Additional details of determining the vehicle control information are discussed below, e.g., with respect to FIG. 11.

Figure 9:
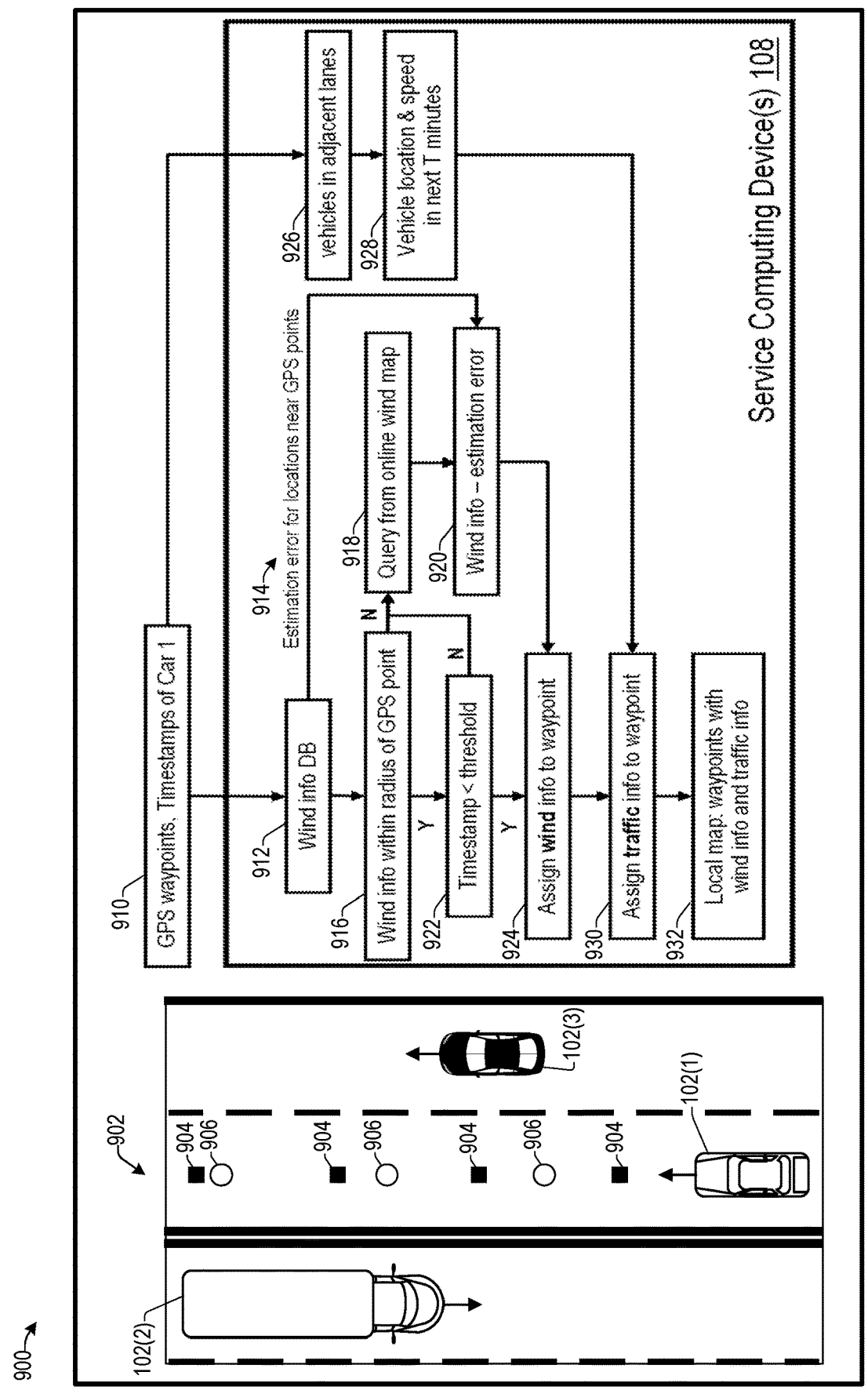
FIG. 9 includes a flow diagram illustrating an example process and a corresponding illustration of waypoints according to some implementations.

FIG. 9 includes a flow diagram illustrating an example process 900 and a corresponding illustration of waypoints according to some implementations. In some examples, the process 900 may be executed by the system 100 discussed above. For example, the process 900 may be executed by the service computing device(s) 108 executing the crosswind management program 118.

In some examples, to generate vehicle control information, a local map for each trajectory waypoint is constructed. In this example, a local map is constructed including a plurality of waypoints, and in which wind information and traffic information are calculated for each waypoint. The left side of FIG. 9 illustrates a traffic map 902 including a first vehicle 102(1) for which the control information will be generated, and second vehicle 102(2) and third vehicle 102(3), which are other vehicles traveling at certain speeds in the vicinity of the first vehicle 102(1). For example, the speeds and locations of the second and third vehicles may be determined directly by the data analytics platform if the second and third vehicles are connected for communication with that data analytics platform, or, alternatively, the speeds and locations of the second and third vehicles may be estimated by the data analytics platform based on the vehicle sensor data received from the first vehicle 102(1).

In this example, the rectangular black dashes represent trajectory waypoints 904 predicted for the first vehicle 102(1) for the next T minutes. The white circles represent wind data points 906 determined from the wind information database for the first vehicle 102(1). To generate wind information and traffic information for the next waypoints 904, the waypoint's GPS location may be used to query the wind information database. If the waypoint is within a threshold radius of a current data point in the wind information database, and the time difference is smaller than a time threshold, the corresponding wind data from the wind information database is assigned to the corresponding waypoint 904 as the wind data point 906. Otherwise, wind information for a wind data point 906 is obtained from an online wind map, e.g., from public simulated wind data, and then an estimation error is subtracted from the wind information for the same area that is available in the wind database, e.g., the error with simulation 520 discussed above with respect to FIG. 5. In addition, information for the vehicles in the adjacent lanes, e.g., vehicle 102(2) and 102(3) may also be determined, either directly by the data analytics platform if the vehicles 102(2) and 102(3) are connected to the data analytics platform, or otherwise, based on the detection results from the first vehicle's onboard sensors. In either event, the predicted positions and speeds of the second and third vehicles may be calculated for when the first vehicle 102(1) is at the next waypoint, and can then be added to the waypoints. Waypoints and wind data points may be similarly determined for the second vehicle 102(2) and the third vehicle 102(3) if these vehicles are connected for communication with the service computing devices 108. FIG. 10 discussed additionally below illustrates an example data structure with vehicle trajectory and mapping information for the respective vehicles.

At 910, the service computing device may determine GPS waypoints for the first vehicle for the next T minutes based on a predicted trajectory of the first vehicle.

At 912, the service computing device may access the wind information database based on the GPS waypoints determined for the first vehicle.

At 914, the service computing device may determine estimation errors for locations in the wind information database near to the GPS waypoints.

At 916, the service computing device may identify wind information for wind data points that are within a threshold radius of the respective waypoints determined for the first vehicle.

At 918, if there is not a wind data point within the threshold radius of the GPS waypoint, the service computing device may access the public wind information such as by querying an online wind map to obtain wind information for the GPS waypoint that does not have matching data in the wind information database.

At 920, the service computing device may subtract the estimation error from the public wind information obtained at 918. As mentioned above, the estimation error was already determined at 520 and the data structure of FIG. 5.

At 922, when there is wind information in the wind information database within the threshold radius of the waypoint under evaluation, the service computing device may determine whether the timestamp associated with the wind information database is within a threshold time of the timestamps associated with the GPS waypoints. If so, the process goes to 924. If not, the process goes to 918 to use the public wind information instead I At 924, the service computing device may assign wind information to the waypoint, which may be either the wind information from the wind information database when the time threshold is satisfied, or the public wind information from the online database when the requirements for using the wind information in the wind information database are not met.

At 926, the service computing device may determine whether there are vehicles in adjacent lanes to the first vehicle. As mentioned above, the determination may be made based on information received directly from adjacent vehicles, or may be determined based on camera data, radar data, lidar data, or the like, received from the first vehicle.

At 928, the service computing device may determine vehicle low dictation and speed of the nearby vehicles for the next T minutes.

At 930, the service computing device may assign traffic information to the waypoint. For example, based on the vehicle location and speed determined in 928, the service computing device determines the traffic information for each waypoint. As one example, the computing device may determine whether a vehicle will be adjacent to the first vehicle, such as in a position that may block at least partially wind that might otherwise be encountered by the first vehicle.

At 932, the service computing device may generate the local map including waypoints with wind information and traffic information associated with each of the waypoints.

FIG. 10 illustrates an example data structure 1000 for maintaining vehicle trajectory information for waypoints according to some implementations. In this example, the data structure 1000 includes vehicle ID 1002, lane 1004, latitude 1006, longitude 1008, wind speed and direction 1010, the vehicle heading 1012, and vehicle speed 1014. For example, the vehicle ID 1002, lane 1004, latitude 1006, and longitude 1008 may identify the various different vehicles and their respective locations, and the lane in which each vehicle is traveling. The wind speed and direction 1010 may identify the wind speed and wind direction currently being encountered by the vehicles. The vehicle heading 1012 and vehicle speed 1014 may indicate the current speed and direction in which each vehicle is traveling. The information in the data structure 1000 may be associated with each waypoint for the target vehicle.

Figure 11:
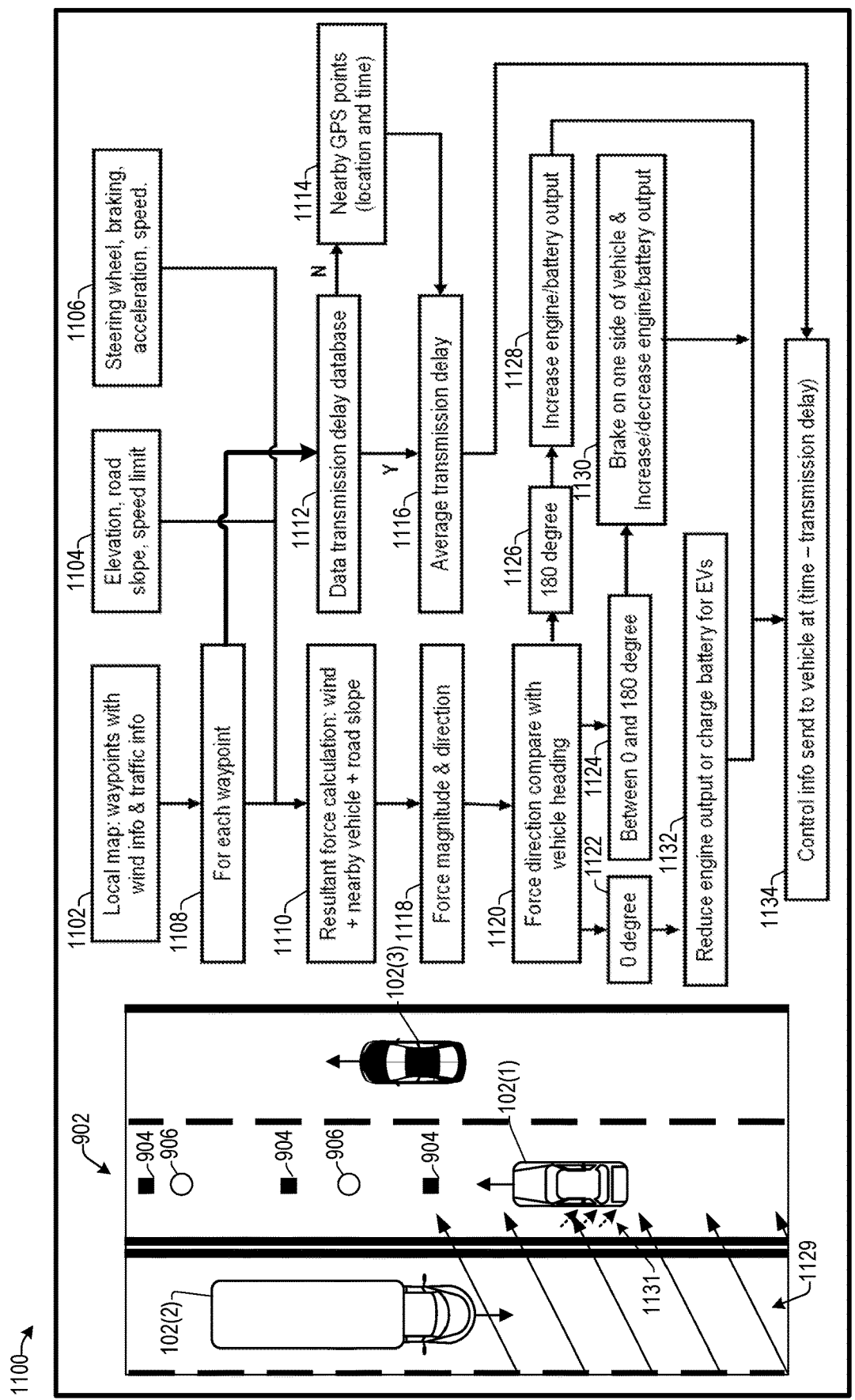
FIG. 11 is a flow diagram illustrating an example process for determining vehicle control information according to some implementations.

FIG. 11 is a flow diagram illustrating an example process 1100 for determining vehicle control information according to some implementations. In some examples, the process 1100 may be executed by the system 100 discussed above. For example, the process 1100 may be executed by the service computing device 108 executing the crosswind management program 118.

To determine the control information for the vehicles, the local map 902 created using the process discussed above with respect to FIG. 9 may be used to generate the control information for a particular vehicle, e.g., the first vehicle 102(1) in this example. For example, for the next waypoint 904 in the vehicle's trajectory, the resultant force expected to be encountered by the vehicle 102(1) may be calculated based on wind information, air pressure caused by nearby vehicles, road slope, and turning angle. Based on the resultant force's direction and magnitude compared to vehicle heading direction, different vehicle control information can be generated. For example, if the resultant force's direction is similar with vehicles heading direction, which means a tailwind is adding extra force to push vehicle forward, the control information may instruct the vehicle control program (or a human operator) to reduce powertrain output (and start regenerative charging in the case of an electric vehicle). In the meanwhile, the data transmission delay information may also be calculated. For example, if the vehicle's next waypoint GPS position is available in the transmission delay database, these data points within a certain threshold may be averaged and used in the last block of the control information calculation.

At 1102, the service computing device may access the local map including the waypoints 904, wind data points 906, and traffic information.

At 1104, the computing device may also access or otherwise receive other data such as road elevation, road slope, speed limit, and so forth. For example, this information may be determined from mapping information and/or from other data such as vehicle sensor data.

At 1106, the computing device may also access or otherwise receive vehicle sensor data that includes steering wheel position, braking information, acceleration information, current vehicle speed, and so forth.

At 1108, the service computing device may select each predicted waypoint for processing individually.

At 1110, the service computing device may calculate the resultant forces from the predicted wind and nearby vehicles and road slope for other configuration.

At 1112, the service computing device may also access the transmission delay database to determine whether a transmission delay is associated with the waypoint. If not, the process goes to 1114. If so, the process goes to 1116.

At 1114, when there is not a data transmission delay associated with the waypoint, the service computing device may determine nearby GPS points that are similar in location and time.

At 1116, the service computing device may determine an average transmission delay for the waypoint which is calculated based on a plurality of transmissions received from vehicles traversing the location, and that are using the same transmission protocol, cellular type, similar data size, and similar traveling speed, and the like.

At 1118, the service computing device may calculate the wind force magnitude and direction for the waypoint.

At 1120, the service computing device may determine the wind direction and compare the wind direction with the vehicle heading.

At 1122, if the service computing device determines that the direction of the wind is zero degrees with respect to the vehicle heading, the process goes to 1132.

At 1124, if the service computing device determines that the direction of the wind is between zero and 180 degrees with respect to the heading of the vehicle the process goes to 1130.

At 1126, if the service computing device determines that the direction of the wind is at 180 degrees with respect to the heading of the vehicle the process goes to 1128

At 1128, when the wind direction is 180 degrees with respect to the heading of the vehicle, i.e., the vehicle is traveling into a headwind, the service computing device may instruct the vehicle control program to increase the powertrain output to compensate for the headwind.

At 1130, when the wind direction is between zero and hundred 80 degrees with respect to the heading of the vehicle, the service computing device may instruct the vehicle control program to break on one side of the vehicle and/or increase the powertrain output on the other side of the vehicle depending on which side of the vehicle the wind is blowing against. For example, as illustrated in the map 902, suppose that the wind 1129 is blowing from the left rear of the first vehicle 102(1). To compensate for the crosswind component of the wind 1129, the vehicle control program may be instructed to partially apply the left rear brake to provide a force indicated by dashed lines 1131 that counteracts the crosswind component of the wind 1129. Alternatively, if the vehicle is capable, the vehicle control program may be instructed to direct increased power to the right front wheel of the vehicle rather than or in addition to partially breaking the left rear wheel of the vehicle. Furthermore, while several examples of control information for a vehicle are described herein, numerous variations will be apparent to those of skill in the art having the benefit of the disclosure herein.

At 1132, when the direction of the wind is zero degrees, i.e., a tailwind, the service computing device may be instructed to reduce the output of the powertrain, apply regenerative braking, or the like to maintain the vehicle at the desired speed.

At 1134, the service computing device may send the determined control information to the first vehicle 102(1) at a timing that is based at least in part on taking into consideration the transmission delay associated with the selected waypoint.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more service computing devices configured by executable instructions to perform operations comprising:
receiving, from a vehicle computing device onboard a vehicle, a communication including sensor data obtained from at least one sensor onboard the vehicle;
determining, based at least on the communication, a transmission delay corresponding to a difference between a time when the vehicle sent the communication and a time when the communication was received by the one or more service computing devices;
determining, based at least on the communication, a trajectory of the vehicle on a travel route of the vehicle;
determining, based at least on the sensor data, wind information for one or more locations associated with the trajectory of the vehicle;
determining vehicle control information for the vehicle based at least on the wind information, the trajectory, and the transmission delay; and
sending, to the vehicle, based at least on the vehicle control information, at least one instruction causing the vehicle to perform at least one control operation for traversing the one or more locations.

2. The system as recited in claim 1, wherein the at least one instruction causes the vehicle computing device to perform the at least one control operation to control at least one vehicle system based at least in part on a predicted effect of wind on the vehicle at the one or more locations.

3. The system as recited in claim 1, wherein determining, based at least on the sensor data, wind information for one or more locations associated with the trajectory of the vehicle further comprises:
determining, from the received sensor information, a roll, pitch, and yaw of the vehicle; and
determining, based at least on the roll, pitch, and yaw of the vehicle, at least one of a wind direction or a wind speed at a location associated with the vehicle.

4. The system as recited in claim 1, the operations further comprising:
determining, based at least on the sensor data, a location of at least one object relative to the vehicle, wherein at least one instruction sent to the vehicle is further based on the location of the at least one object relative to the vehicle.

5. The system as recited in claim 1, the operations further comprising storing the transmission delay in a transmission delay data structure in association at least with a vehicle location and vehicle information including at least one of an identifier of the vehicle, a speed of the vehicle, a communication protocol used by the vehicle, a communication provider used by the vehicle, or a size of the sensor data,
wherein the operation of determining the vehicle control information based on the transmission delay is further based on information in the transmission delay data structure.

6. The system as recited in claim 1, the operations further comprising:
generating, based at least on the communication received from the vehicle, a local map including a plurality of waypoints for an upcoming period, the plurality of waypoints corresponding the one or more locations associated with the trajectory of the vehicle; and
determining a plurality of wind data points for the plurality of waypoints, the plurality of wind data points each indicating a predicted wind direction and wind speed at a respective location of the wind data point,
wherein the at least one instruction is determined based on the predicted wind direction and wind speed at the respective locations of the wind data points.

7. The system as recited in claim 1, the operations further comprising:
determining a location associated with the wind information determined based at least on the sensor data;
searching a wind information database to determine whether an entry in the database already exists that corresponds to the location;
based on locating an existing entry in the wind information database corresponding to the location, determining whether a difference between the wind information determined based on the sensor data and wind information for the existing entry is less than a wind threshold; and
based on the difference being less than the wind threshold, updating the wind information database with an entry that is based on both the wind information determined based on the sensor data and the wind information for the existing entry.

8. A method comprising:
receiving, by one or more service computing devices, from a vehicle computing device onboard a vehicle, a communication including sensor data obtained from at least one sensor onboard the vehicle;
determining, based at least on the communication, a transmission delay corresponding to a difference between a time when the vehicle sent the communication and a time when the communication was received by the one or more service computing devices;
determining, based at least on the communication, a trajectory of the vehicle on a travel route of the vehicle;
determining, based at least one the sensor data, wind information for one or more locations associated with the trajectory of the vehicle;
determining vehicle control information for the vehicle based at least on the sensor data, the trajectory, the wind information, and the transmission delay
sending, to the vehicle, based at least on the vehicle control information, at least one instruction causing the vehicle to perform at least one control operation for traversing the one or more locations associated with the trajectory of the vehicle.

9. The method as recited in claim 8, wherein the at least one instruction causes the vehicle computing device to perform the at least one control operation to control at least one vehicle system based at least in part on a predicted effect of wind on the vehicle at the one or more locations.

10. The method as recited in claim 9, wherein determining, based at least on the sensor data, the wind information for the one or more locations associated with the trajectory of the vehicle further comprises:
determining, from the received sensor information, a roll, pitch, and yaw of the vehicle; and determining, based at least on the roll, pitch, and yaw of the vehicle, at least one of a wind direction or a wind speed at a location associated with the vehicle.

11. The method as recited in claim 8, further comprising: determining, based at least on the sensor data, a location of at least one object relative to the vehicle, wherein the at least one instruction sent to the vehicle is further based on the location of the at least one object relative to the vehicle.

12. The method as recited in claim 8, further comprising storing the transmission delay in a transmission delay data structure in association at least with a vehicle location and vehicle information including at least one of an identifier of the vehicle, a speed of the vehicle, a communication protocol used by the vehicle, a communication provider used by the vehicle, or a size of the sensor data,
wherein the operation of determining the vehicle control information based on the transmission delay is further based on information in the transmission delay data structure.

13. The method as recited in claim 8, further comprising:
generating, based at least on the communication received from the vehicle, a local map including a plurality of waypoints for an upcoming period, the plurality of waypoints corresponding the one or more locations associated with the trajectory of the vehicle; and
determining a plurality of wind data points for the plurality of waypoints, the plurality of wind data points each indicating a predicted wind direction and wind speed at a respective location of the wind data point,
wherein the at least one instruction is determined based on the predicted wind direction and wind speed at the respective locations of the wind data points.

14. A method comprising:
sending, by one or more processors onboard a vehicle, over a network to a service computing device remote from the vehicle, a communication including sensor data received from at least one sensor onboard the vehicle, the service computing device configured to determine wind information and a transmission delay associated with a location of the vehicle based at least on the communication including the sensor data;
receiving, by the one or more processors onboard the vehicle, in reply to the communication, at least one instruction based on the wind information and transmission delay information determined by the service computing device based on the communication including the sensor data, the at least one instruction instructing at least one control operation to control at least one vehicle system based at least in part on a predicted effect of wind on the vehicle at one or more locations during an upcoming period; and
controlling, by the one or more processors onboard the vehicle, based on the at least one instruction, the at least one vehicle system during traversal of the one or more locations.

15. The method as recited in claim 14, wherein the sensor data sent to the service computing device includes sensor data that enables the service computing device to calculate a roll, pitch, and yaw of the vehicle for determining, at least in part, the wind information at the location of the vehicle.

16. The method as recited in claim 15, wherein the sensor data that enables the service computing device to calculate a roll, pitch, and yaw of the vehicle includes at least one of suspension system height measurement or inertial measurement unit data, and further includes at least one of steering wheel position information, braking information, or powertrain acceleration information.

17. The method as recited in claim 14, wherein the sensor data sent to the service computing device includes sensor data that enables the service computing device to determine, based at least on the sensor data, a location of at least one object relative to the vehicle, wherein at least one instruction received by the vehicle is further based on the location of the at least one object relative to the vehicle.

18. The method as recited in claim 14, further comprising, prior to sending the sensor data to the service computing device, preprocessing at least one of camera data, lidar data, or radar data to reduce a size of the sensor data transmitted to the service computing device.

19. The method as recited in claim 14, wherein the communication including the sensor data includes a timestamp determined based on receiving timing information from a satellite positioning system, the timestamp enabling, at least in part, the service computing device to determine the transmission delay information.

* * * * *